US012753896B2

(12) United States Patent
Kim et al.

(10) Patent No.: US 12,753,896 B2
(45) Date of Patent: Oct. 6, 2026

(54) VEHICLE LAMP

(71) Applicant: SL Corporation, Daegu (KR)

(72) Inventors: Hyungdo Kim, Gyeongsan-si (KR); Junwoo Woo, Gyeongsan-si (KR); Minseop Lee, Gyeongsan-si (KR)

(73) Assignee: SL Corporation, Daegu (KR)

( * ) Notice: Subject to any disclaimer, the term of this patent is extended or adjusted under 35 U.S.C. 154(b) by 0 days.

(21) Appl. No.: 19/206,195

(22) Filed: May 13, 2025

(65) Prior Publication Data

US 2026/0002650 A1 Jan. 1, 2026

(30) Foreign Application Priority Data

May 13, 2024 (KR) ........................ 10-2024-0062613

(51) Int. Cl.
*F21S 41/265* (2018.01)
*B60Q 1/04* (2006.01)
(Continued)

(52) U.S. Cl.
CPC .............. *F21S 41/265* (2018.01); *B60Q 1/04* (2013.01); *F21S 41/143* (2018.01); *F21S 41/147* (2018.01); *F21S 41/151* (2018.01); *F21S 41/18* (2018.01); *F21S 41/24* (2018.01); *F21S 41/255* (2018.01); *F21S 41/26* (2018.01); *F21S 41/285* (2018.01); *F21S 41/32* (2018.01); *F21S 41/322* (2018.01); *F21S 41/43* (2018.01); *F21S 41/47* (2018.01); *F21S 41/663* (2018.01); *F21V 5/007* (2013.01); *F21V 5/008* (2013.01); *F21S 45/48* (2018.01); *F21W 2102/155* (2018.01); *F21Y 2115/10* (2016.08)

(58) Field of Classification Search
CPC ........ F21S 41/285; F21S 41/151; F21S 41/26; B60Q 1/04; F21V 5/007; F21V 5/008
See application file for complete search history.

(56) References Cited

U.S. PATENT DOCUMENTS

2018/0087732 A1* 3/2018 De Lamberterie ..... F21S 41/26
2018/0320852 A1* 11/2018 Mandl .................. F21S 41/151
(Continued)

FOREIGN PATENT DOCUMENTS

WO WO-2021025136 A1 * 2/2021 .............. F21S 41/24

OTHER PUBLICATIONS

Machine translation of Koizumi et al., WO 2021025136 A1, published Feb. 11, 2021 (Year: 2021).*

*Primary Examiner* — William N Harris
(74) *Attorney, Agent, or Firm* — United One Law Group LLC; Kongsik Kim; Jhongwoo Peck

(57) ABSTRACT

A vehicle lamp includes a plurality of light source modules arranged in at least one direction; a plurality of adjusting lenses that guide light incident from each of the plurality of light source modules to adjust the path of the light; and a plurality of optical lenses that is tilted such that a first end is disposed more forward than a second end in at least one direction and outputs at least a portion of light, which is guided by and incident from each of the plurality of adjusting lenses, to form a predetermined beam pattern. Each of the plurality of optical lenses includes an incident lens portion including a plurality of incident lenses; and an exit lens portion including a plurality of exit lenses corresponding to the incident lenses.

20 Claims, 27 Drawing Sheets

(51) Int. Cl.

| | |
|---|---|
| ***F21S 41/14*** | (2018.01) |
| ***F21S 41/143*** | (2018.01) |
| ***F21S 41/147*** | (2018.01) |
| ***F21S 41/151*** | (2018.01) |
| ***F21S 41/20*** | (2018.01) |
| ***F21S 41/24*** | (2018.01) |
| ***F21S 41/255*** | (2018.01) |
| ***F21S 41/26*** | (2018.01) |
| ***F21S 41/32*** | (2018.01) |
| ***F21S 41/43*** | (2018.01) |
| ***F21S 41/47*** | (2018.01) |
| ***F21S 41/663*** | (2018.01) |
| ***F21S 45/48*** | (2018.01) |
| ***F21V 5/00*** | (2018.01) |
| ***F21W 102/155*** | (2018.01) |
| ***F21Y 115/10*** | (2016.01) |

(56) References Cited

U.S. PATENT DOCUMENTS

| | | | | |
|---|---|---|---|---|
| 2019/0024865 | A1* | 1/2019 | Kim | F21S 41/285 |
| 2022/0205608 | A1* | 6/2022 | Go | F21S 41/29 |
| 2023/0358388 | A1* | 11/2023 | Kang | F21V 5/007 |
| 2023/0417384 | A1* | 12/2023 | Woo | F21S 41/143 |
| 2025/0198583 | A1* | 6/2025 | Kim | F21S 41/663 |

* cited by examiner

| LENGTH (D1) OF EXIT LENS IN LEFT-RIGHT DIRECTION AND LENGTH (D2) IN UP-DOWN DIRECTION | OPTICAL PATH |
|---|---|
| d1=d2 |  |
| d1 < d2 |  |

VEHICLE LAMP

CROSS-REFERENCE TO RELATED APPLICATION

This application claims priority from Korean Patent Application No. 10-2024-0062613 filed on May 13, 2024, which is incorporated herein by reference in its entirety.

BACKGROUND

1. Technical Field

The present disclosure relates to a vehicle lamp, and more particularly, to a vehicle lamp that can form an optimal beam pattern while implementing a slim exterior design.

2. Description of the Related Art

Generally, a vehicle includes various lamps having an illumination function and a signaling function. The illumination function enables the driver of the vehicle to more easily detect objects around the vehicle while driving in low-light conditions (e.g., night-time driving), and the signaling function is used to inform other vehicles or pedestrians of the vehicle's driving state.

For example, a headlamp and a fog lamp are designed primarily for the illumination function, and a turn signal lamp, a tail lamp, and a brake lamp are designed primarily for the signaling function. The installation standards and specifications of each lamp are prescribed by law so that each function can be fully exerted.

Among the lamps, the headlamp plays a very important role in ensuring safe driving by securing the driver's view ahead. Recently, the decision to purchase a vehicle has been greatly affected by the aesthetic aspect that consumers feel through improved exterior design of the headlamps as well as the functional aspect of helping safe driving by securing the driver's view, which is the basic role of the headlamp.

Therefore, it is required to develop a means to form an optimal beam pattern while making aesthetically pleasing to the consumers by implementing a slim exterior design.

SUMMARY

Aspects of the present disclosure provide a vehicle lamp which prevents glare from occurring due to light irradiated in unnecessary directions while implementing a slim exterior design by arranging a plurality of lamp modules.

Aspects of the present disclosure also provide a vehicle lamp which can simplify a manufacturing process and reduce costs by enabling common use of elements for forming different pattern areas within a beam pattern.

However, aspects of the present disclosure are not restricted to those set forth herein. The above and other aspects of the present disclosure will become more apparent to one of ordinary skill in the art to which the present disclosure pertains by referencing the detailed description of the present disclosure given below.

According to an aspect of the present disclosure, a vehicle lamp may include a plurality of light source modules arranged in at least one direction; a plurality of adjusting lenses that guide light incident from each of the plurality of light source modules to adjust a path of the light; and a plurality of optical lenses that are tilted such that a first end is disposed more forward than a second end in at least one direction and output at least a portion of light, which is guided by and incident from each of the plurality of adjusting lenses, to form a predetermined beam pattern. Each of the plurality of optical lenses may include an incident lens portion including a plurality of incident lenses; and an exit lens portion including a plurality of exit lenses corresponding to the incident lenses.

Each of the plurality of light source modules may include a main light source that emits light for forming a main beam pattern; and sub-light sources that emit light for forming a sub-beam pattern. The sub-light sources may be disposed symmetrically at both sides of the main light source along at least one direction. The main light source may be disposed at a center of a corresponding adjusting lens among the plurality of adjusting lenses in one direction.

An optical axis of each of the plurality of light source modules may be tilted in at least one direction with respect to a central axis of a corresponding adjusting lens among the plurality of adjusting lenses.

The plurality of light source modules may be installed on a common substrate. The common substrate may be tilted such that a first end thereof is disposed more forward than a second end thereof in the at least one direction, and the plurality of light source modules may be tilted at an angle corresponding to a tilt angle of the common substrate.

Each of the plurality of adjusting lenses may include an incident portion to which light emitted from a corresponding light source module among the plurality of light source modules is incident; and an exit portion from which the light incident on the incident portion is output. Further, a diffusion pattern may be formed on at least some of side surfaces that extend between the incident portion and the exit portion to diffuse light.

The incident portion may include a first incident surface formed convexly toward a corresponding light source module among the plurality of light source modules; a second incident surface formed to protrude from peripheral edges of the first incident surface toward the corresponding light source module; and a reflective surface that reflects light, which is incident on the second incident surface, toward the exit portion. The exit portion may include a plurality of exit surfaces having different curvatures.

The incident lens portion may further include a first optical member having the plurality of incident lenses on an incident surface thereof, the exit lens portion may further include a second optical member disposed in front of the first optical member and having the plurality of exit lenses on an exit surface thereof, and an exit surface of the first optical member and an incident surface of the second optical member may face each other.

At least one of the plurality of incident lenses and at least another of the plurality of incident lenses may have different curvatures in at least a portion thereof. The plurality of incident lenses may include a first incident lens that forms a first pattern area of the predetermined beam pattern; and a second incident lens that forms a second pattern area of the predetermined beam pattern. The first incident lens and the second incident lens may have different curvatures in at least a portion thereof.

Light incident on the first incident lens may be output after being focused at a rear focus of an exit lens corresponding to the first incident lens among the plurality of exit lenses, and at least a portion of light incident on the second incident lens may be output through another exit lens adjacent to an exit lens corresponding to the second incident lens among the plurality of exit lenses.

The plurality of incident lenses may be arranged such that a plurality of lens rows each formed to extend in a first direction are arranged in a second direction intersecting the first direction, and the plurality of lens rows may include a first row including the first incident lens and a second row including the second incident lens.

Each of the plurality of incident lenses may include a first incident area and a second incident area, and the first incident lens and the second incident lens may have different curvatures in at least a portion of at least one of the first incident area or the second incident area. Each of the plurality of incident lenses may further include a third incident area disposed between the first incident area and the second incident area. The third incident area may cause light incident thereto to proceed as substantially parallel light.

Each of the plurality of exit lenses may be longer in an up-down direction than in a left-right direction.

Each of the plurality of optical lenses may further include a plurality of shields which obstruct a portion of light that proceeds toward the plurality of exit lenses. A center of a top edge of each of the plurality of shields may be disposed at a rear focus of a corresponding exit lens among the plurality of exit lenses, and at least a portion of the top edge of each of the plurality of shields may be inclined such that a first side is disposed higher than a second side along the left-right direction.

A vehicle lamp of the present disclosure described above provides at least one of the following advantages.

An optical lens for irradiating light to the outside of a vehicle from each of a plurality of light source modules includes a plurality of incident lenses and a plurality of exit lenses, and at least one of the incident lenses and at least another one of the incident lenses are formed to have different curvatures in at least a portion. Therefore, the optical lens can be commonly used even when different pattern areas in a beam pattern are to be formed. This reduces manufacturing processes and reduces costs.

In addition, the exit lenses are formed to be longer in an up-down direction than in a left-right direction. Therefore, light incident on each of the incident lenses can be prevented from causing glare by being output not only through a corresponding exit lens among the plurality of exit lenses but also through other adjacent exit lenses.

However, the effects of the present disclosure are not restricted to those set forth herein. The above and other effects of the present disclosure will become more apparent to one of ordinary skill in the art to which the present disclosure pertains by referencing the claims.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
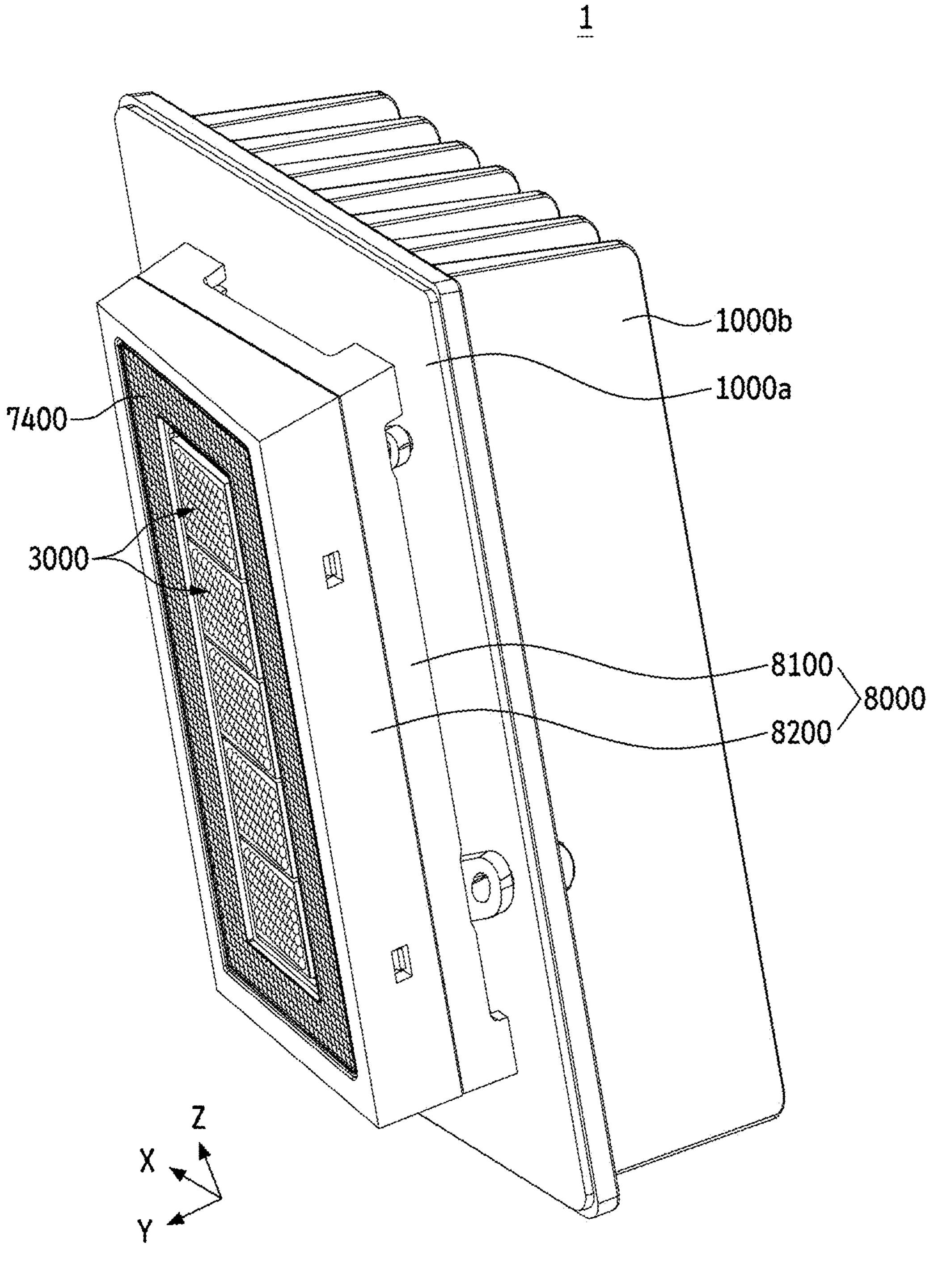
FIG. 1 is a perspective view of a vehicle lamp according to an embodiment of the present disclosure.

Advantages and features of the present disclosure and methods of accomplishing the same may be understood more readily by reference to the following detailed description of exemplary embodiments and the accompanying drawings. The present disclosure may, however, be embodied in many different forms and should not be construed as being limited to the embodiments set forth herein. Rather, these embodiments are provided so that this disclosure will be thorough and complete and will fully convey the concept of the disclosure to those skilled in the art, and the present disclosure will only be defined by the appended claims. Throughout the specification, like reference numerals in the drawings denote like elements.

In some embodiments, well-known steps, structures and techniques will not be described in detail to avoid obscuring the disclosure.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Embodiments of the disclosure are described herein with reference to plan and cross-section illustrations that are schematic illustrations of exemplary embodiments of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing. In the drawings, respective components may be enlarged or reduced in size for convenience of explanation.

Hereinafter, the preset disclosure will be described with reference to the drawings for describing vehicle lamps according to embodiments of the present disclosure.

Figure 2:
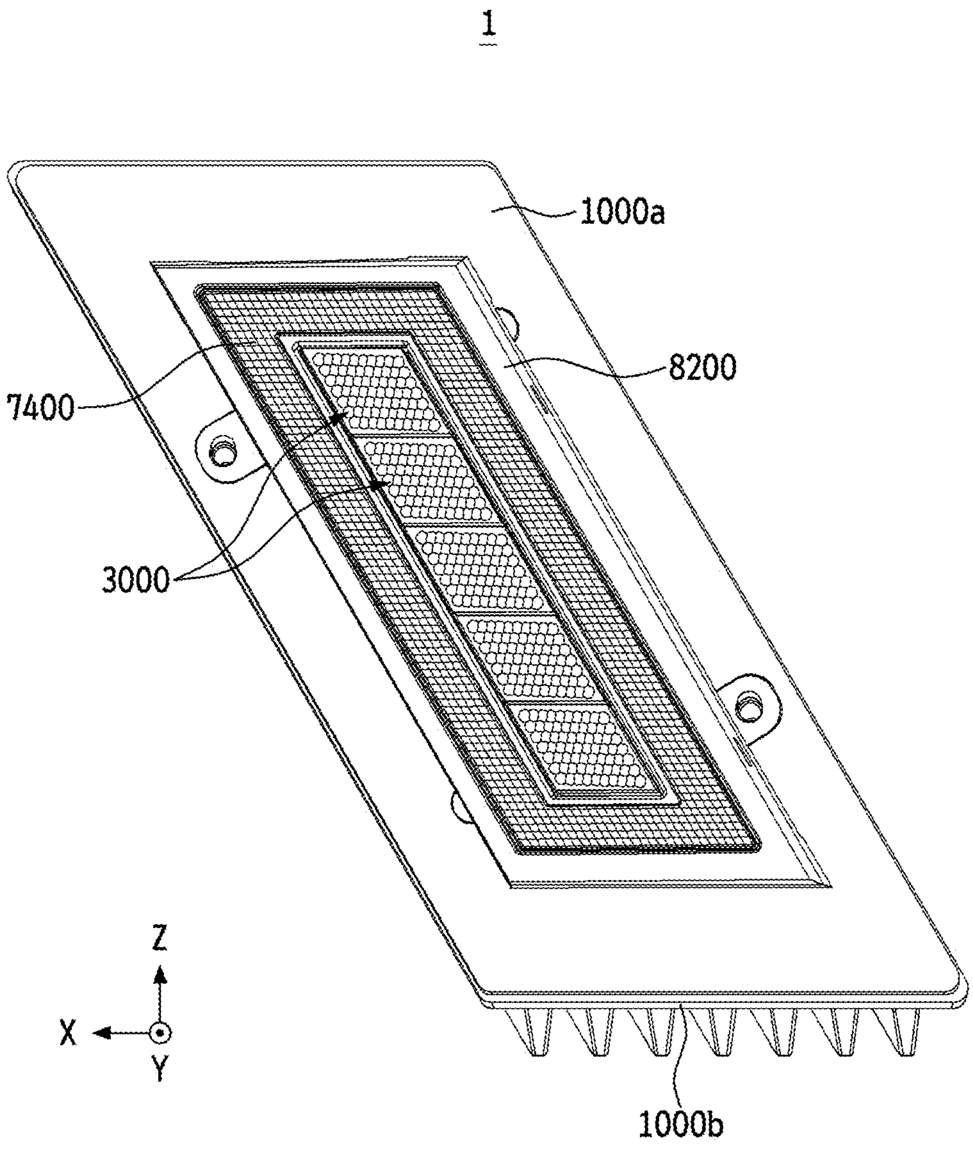
FIG. 2 is a front view of the vehicle lamp according to the embodiment of the present disclosure.
Figure 3:
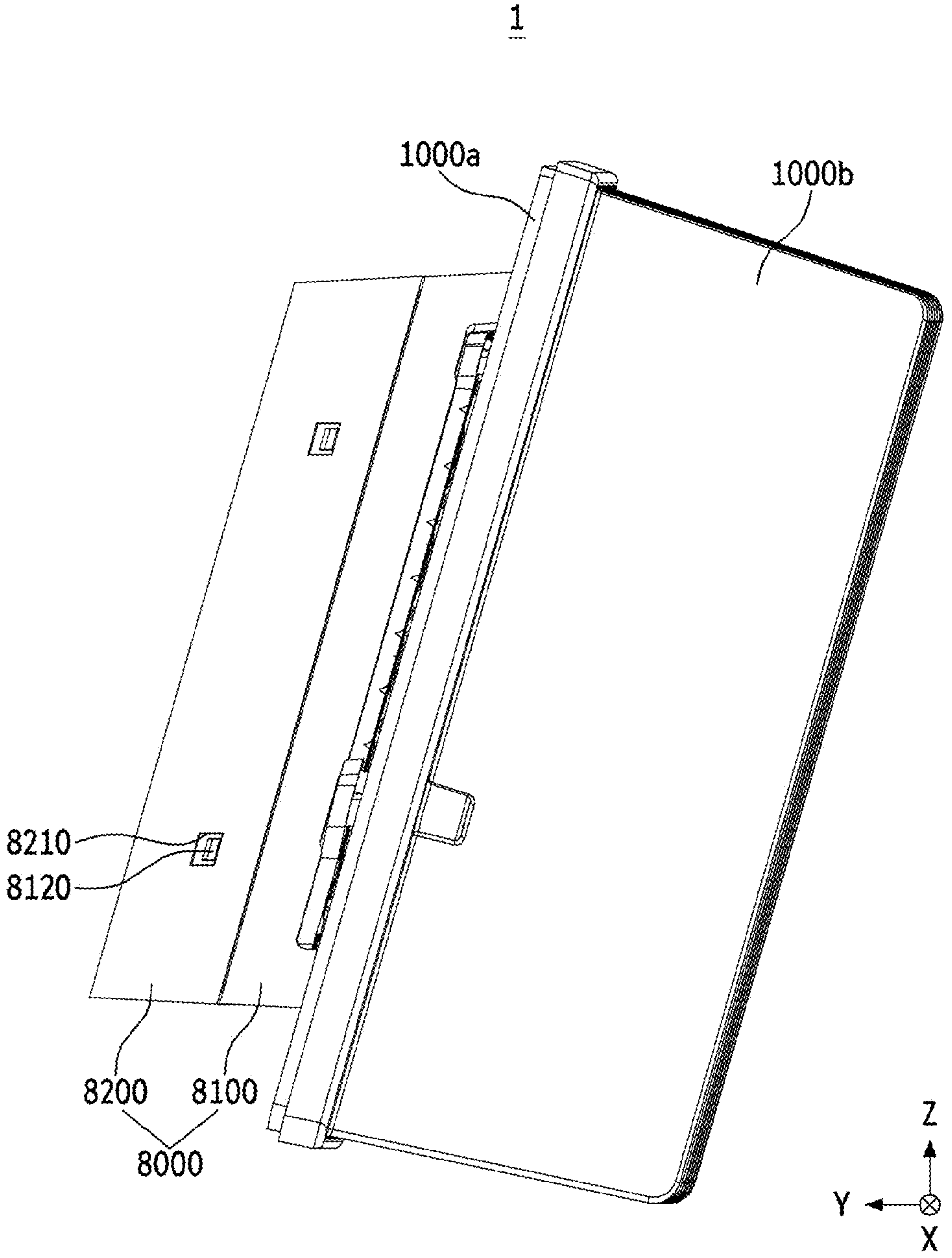
FIG. 3 is a side view of the vehicle lamp according to the embodiment of the present disclosure.
Figure 4:
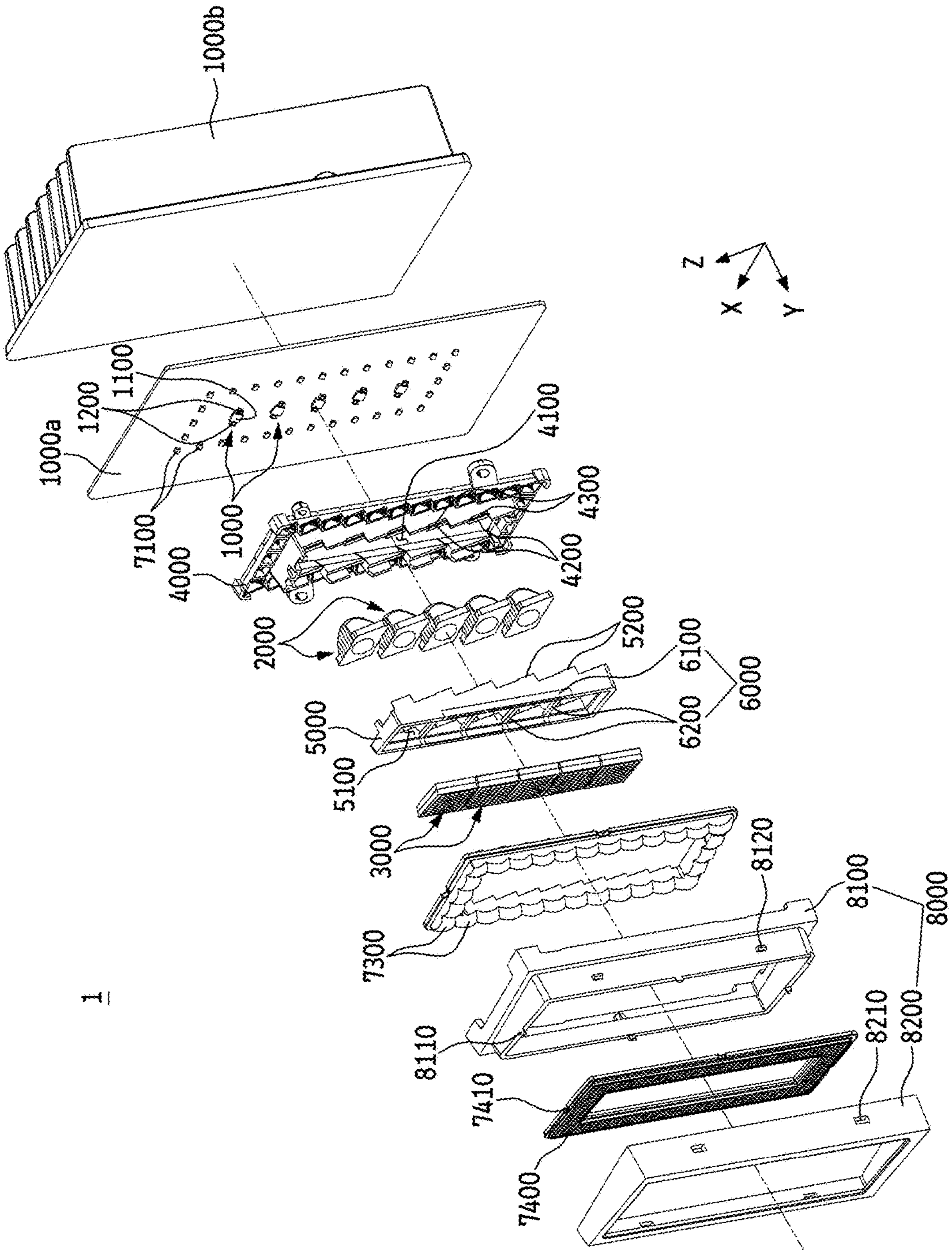
FIG. 4 is an exploded perspective view of the vehicle lamp according to the embodiment of the present disclosure.
Figure 5:
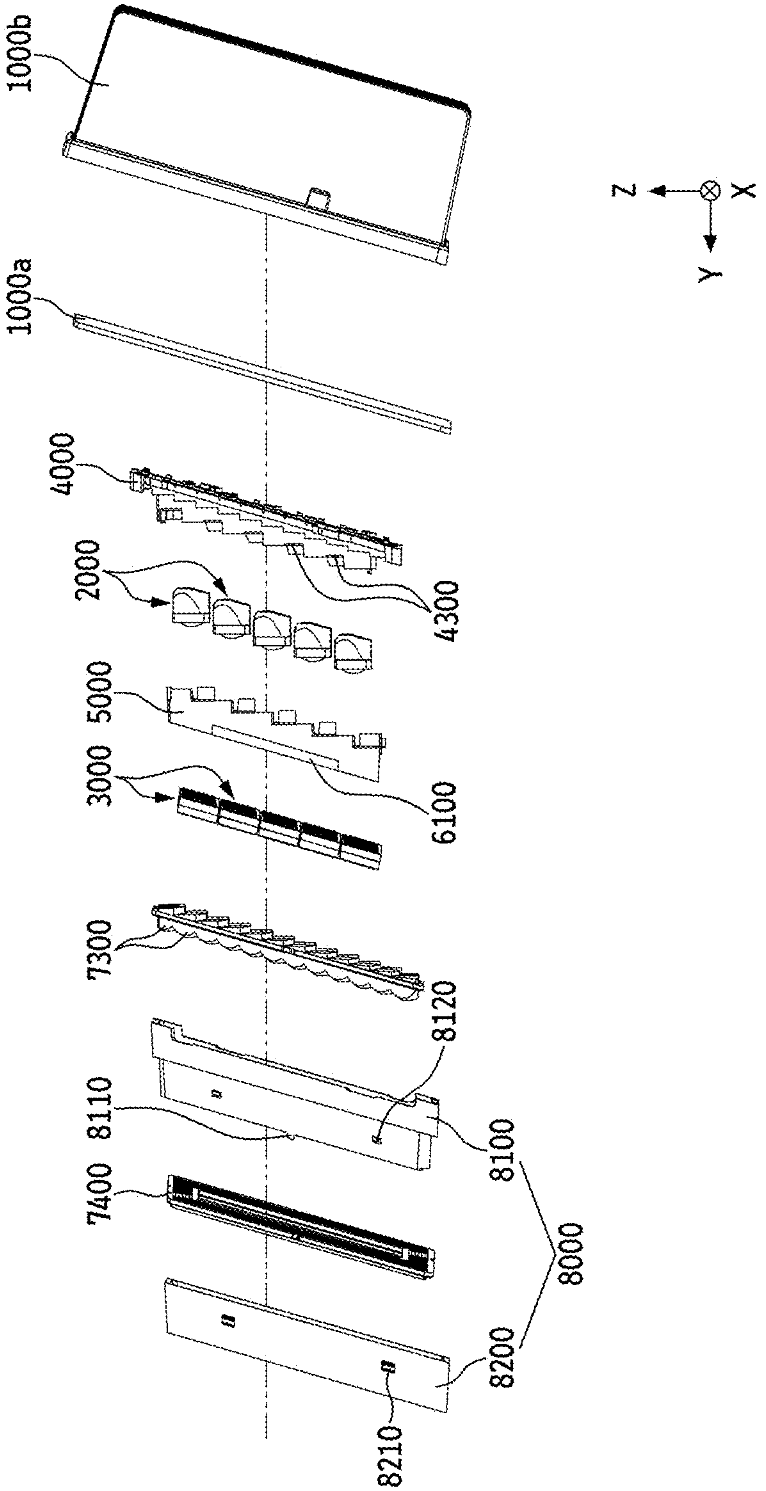
FIG. 5 is an exploded view illustrating a side of the vehicle lamp according to the embodiment of the present disclosure.

FIG. 1 is a perspective view of a vehicle lamp 1 according to an embodiment of the present disclosure. FIG. 2 is a front view of the vehicle lamp 1 according to the embodiment of the present disclosure. FIG. 3 is a side view of the vehicle lamp 1 according to the embodiment of the present disclosure. FIG. 4 is an exploded perspective view of the vehicle lamp 1 according to the embodiment of the present disclosure. FIG. 5 is an exploded view illustrating a side of the vehicle lamp 1 according to the embodiment of the present disclosure.

Referring to FIGS. 1 through 5, the vehicle lamp 1 according to the embodiment of the present disclosure may include a plurality of light source modules 1000, a plurality of adjusting lenses 2000, and a plurality of optical lenses 3000. In the embodiment of the present disclosure, a case where an X-axis direction is a left-right (e.g., lateral) direction and refers to a vehicle width direction, a Y-axis direction is a front-back (e.g., longitudinal) direction and refers to a driving direction, and a Z-axis direction is an up-down (e.g., vertical) direction and refers to a vehicle height direction will be described below as an example. However, the present disclosure is not limited thereto, and the directions actually meant by an X axis, a Y axis, and a Z axis may vary depending on the installation direction or position of the vehicle lamp 1 of the present disclosure.

In the embodiment of the present disclosure, a case where the vehicle lamp 1 is used as a headlamp will be described as an example, wherein the headlamp irradiates light in the driving direction of a vehicle to secure a driver's view ahead when the vehicle is operated at night or in a dark place such as a tunnel. However, the present disclosure is not limited to this case, and the vehicle lamp 1 of the present disclosure can be used not only as a headlamp but also as various lamps installed in the vehicle, such as a fog lamp, a daytime running lamp, a turn signal lamp, a tail lamp, a backup lamp, and a brake lamp. The vehicle lamp 1 of the present disclosure can be used as any one function of the various lamps described above or can be used as two or more functions.

Figure 6:
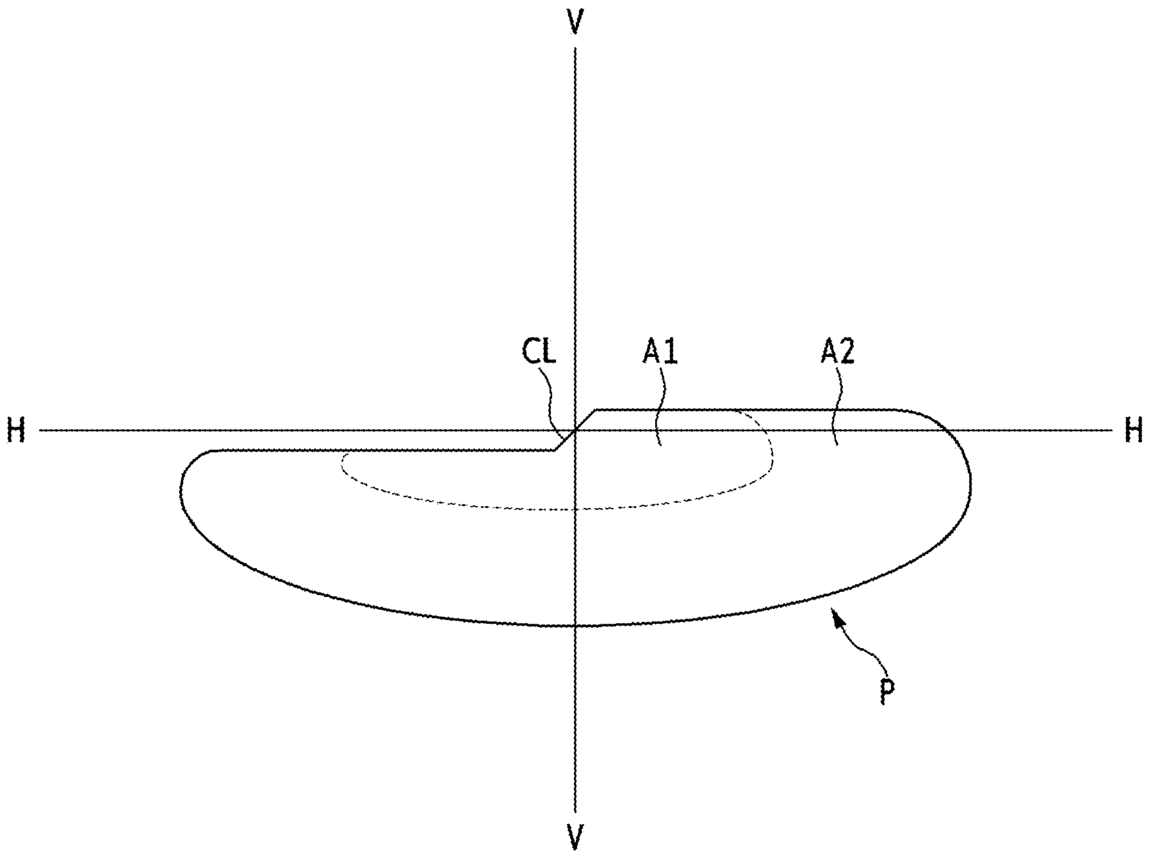
FIG. 6 is a schematic diagram illustrating a beam pattern formed by the vehicle lamp according to the embodiment of the present disclosure.

When the vehicle lamp 1 of the present disclosure is used as a headlamp, it may form at least one of a low beam pattern or a high beam pattern. The low beam pattern may be formed by irradiating light below a cutoff line having a predetermined shape so as not to dazzle drivers of vehicles ahead such as preceding vehicles or oncoming vehicles while ensuring a wider field of view for a relatively short distance from the vehicle. The high beam pattern may be formed by irradiating at least some light above the cutoff line to secure a longer visibility distance for a relatively long distance from the vehicle. In the embodiment of the present disclosure, a case where a low beam pattern P having a cutoff line CL of a predetermined shape is formed as shown in FIG. 6 will be described as an example.

Here, the low beam pattern P may include a high-illumination area A1 and a spread area A2. The high-illumination area A1 has a higher brightness to secure a sufficient visibility distance. The spread area A2 has a lower brightness than the high-illumination area A1 but is formed to expand in at least one of the left-right direction or the up-down direction from the high-illumination area A1 to secure a sufficient field of view. In the embodiment of the present disclosure, a case where the low beam pattern P is a beam pattern formed by light irradiated onto a screen located at a set distance from the vehicle will be described as an example.

In the embodiment of the present disclosure, a case where the vehicle lamp 1 includes a plurality of lamp modules arranged in the up-down direction will be described as an example, in which each of the plurality of lamp modules includes a light source module, an adjusting lens, and an optical lens corresponding to each other among the plurality of light source modules 1000, the plurality of adjusting lenses 2000, and the plurality of optical lenses 3000. However, this is merely an example used to help understand the present disclosure, and the present disclosure is not limited thereto. The number and arrangement direction of lamp modules included in the vehicle lamp 1 of the present disclosure may vary depending on the light distribution characteristics of a beam pattern to be formed by the vehicle lamp 1 of the present disclosure, that is, the position, size, shape, brightness, or the like of an area to which light is irradiated.

Here, a case where the lamp modules are arranged in the up-down direction and are arranged more forward and more toward one lateral side as they go from top to bottom will be described as an example. This arrangement may ensure that the lamp modules are arranged along the body contour of the vehicle.

In other words, this is to ensure that the vehicle lamp 1 of the present disclosure is accommodated in an internal space formed by a lamp housing and a cover lens coupled to the lamp housing and that the lamp modules are arranged according to the contour of the cover lens that forms a part of the body line of the vehicle.

For example, when the cover lens is shaped as a flat surface facing straight forward, the lamp modules may be arranged in the up-down direction along the same longitudinal and lateral positions in the front-back direction and the left-right direction. However, when the cover lens is shaped as a flat or curved surface inclined at a predetermined angle with respect to the front along at least one direction, the lamp modules may be arranged in the up-down direction, and lamp modules adjacent to each other in at least one of the front-back direction or the left-right direction may be misaligned with (e.g., offset or staggered from) each other.

Here, when the lamp modules adjacent to each other among the plurality of lamp modules are misaligned with each other, it may be understood that at least one of a light source module, an adjusting lens, or an optical lens constituting each of the plurality of lamp modules is misaligned with the corresponding component of the other lamp module.

A beam pattern of the vehicle lamp 1 of the present disclosure may be formed by overlapping or synthesizing pattern areas formed by the lamp modules, respectively. In other words, a beam pattern of the vehicle lamp 1 of the present disclosure may be formed by overlapping pattern areas having the same light distribution characteristics formed by the lamp modules, respectively, or may be formed by synthesizing pattern areas having different light distribution characteristics formed by the lamp modules, respectively.

For example, when the low beam pattern P of FIG. 6 is formed by the vehicle lamp 1 of the present disclosure and when two lamp modules form pattern areas have different light distribution characteristics, one of the lamp modules may form the high-illumination area A1 in the low beam pattern P, and the other of the lamp modules may form the spread area A2 in the low beam pattern P.

Each of the plurality of light source modules 1000 may include a main light source 1100 and one or more sub-light sources 1200. The main light source 1100 may generate light in an amount and/or color suitable for a main beam pattern to be formed by the vehicle lamp 1 of the present disclosure. In the embodiment of the present disclosure, a case where the main beam pattern is used to secure the driver's view, such as the above-described low beam pattern P of FIG. 6, will be described as an example.

The sub-light sources 1200 may generate light in an amount and/or color suitable for a sub-beam pattern to be formed by the vehicle lamp 1 of the present disclosure. In the embodiment of the present disclosure, a case where the sub-beam pattern is used for informing the driver or pedestrians of the driving state of the vehicle, such as a daytime running lamp or a turn signal lamp, will be described as an example.

Here, the sub-light sources 1200 may be arranged symmetrically on both sides of the main light source 1100 in at least one direction. Since the main light source 1100 is disposed at a center of each adjusting lens 2000, which will be described later, if the sub-light sources 1200 are not arranged symmetrically on both sides of the main light source 1100 in at least one direction, the sub-beam pattern formed by the sub-light sources 1200 may not have uniform brightness.

In the embodiment of the present disclosure, a case where semiconductor light emitting elements such as light emitting diodes (LEDs) are used as the main light source 1100 and the sub-light sources 1200 will be described as an example. However, the present disclosure is not limited to this case, and not only LEDs but also various types of light sources such as laser diodes (LDs) or bulbs may be used as the main light source 1100 and the sub-light sources 1200. Depending on the type of light source, an element such as a reflector, a mirror, a prism, or a phosphor may be additionally used to control the brightness, path, color, or the like of the light.

In addition, in the embodiment of the present disclosure, since the main beam pattern is used to secure the driver's view and the sub-beam pattern is used to inform the driver of the driving state, a case where the main light source 1100 exhibits higher brightness than the sub-light sources 1200 will be described as an example. In this case, the main light source 1100 may have a larger packaging size and greater power consumption than the sub-light sources 1200 so that the amount of light emitted from the main light source 1100 is higher than the amount of light emitted from the sub-light sources 1200.

The light source modules 1000 described above may be installed on a common substrate 1000*a*, which may be tilted such that one side is disposed more forward than the other side in at least one direction. Therefore, the number of parts can be reduced, and an assembly process can be simplified compared to a configuration where an individual substrate is used for each of the plurality of light source modules 1000. In addition, since one common substrate 1000*a* can be easily mounted on a heat sink 1000*b*, heat dissipation design can be facilitated more easily.

In the embodiment of the present disclosure, since the lamp modules are disposed more forward going from top to bottom, the light source modules 1000 corresponding to the lamp modules, respectively, may also be disposed more forward from top to bottom. In this case, the common substrate 1000*a* may be tilted such that the bottom end is disposed more forward than the top end to allow the light source modules 1000 to be installed on the one common substrate 1000*a*. Accordingly, the light source modules 1000 installed on the common substrate 1000*a* may also be tilted at an angle corresponding to the tilt angle of the common substrate 1000*a*.

Each of the plurality of adjusting lenses 2000 may guide and adjust the path of the light emitted and incident from a corresponding light source module among the plurality of light source modules 1000.

Each of the plurality of adjusting lenses 2000 may be disposed in front of a corresponding light source module among the plurality of light source modules 1000 to convert the light emitted from the corresponding light source module into parallel light, which is substantially parallel to the substantially front-back direction, and output the parallel light. Accordingly, the light emitted from each of the plurality of light source modules 1000 may be more uniformly incident on a corresponding optical lens among the plurality of optical lenses 3000 disposed in front of the adjusting lenses 2000. This configuration enables a beam pattern formed by the vehicle lamp 1 of the present disclosure to have a more uniform brightness overall.

In the embodiment of the present disclosure, a case where total internal reflection (TIR) lenses are used as the adjusting lenses 2000 will be described as an example. However, the present disclosure is not limited to this case, and not only TIR lenses but also various types of lenses, such as aspherical lenses or Fresnel lenses, which can convert light incident from a corresponding light source module among the plurality of light source modules 1000 into substantially parallel light, can be used as the adjusting lenses 2000.

A case where each of the plurality of adjusting lenses 2000 is disposed in front of a corresponding light source module among the plurality of light source modules 1000 and behind a corresponding optical lens among the plurality of optical lenses 3000 is an example for a case where a direction in which light is irradiated from the vehicle lamp 1 of the present disclosure is assumed to be a forward direction. However, the direction actually meant by "forward" may vary depending on the installation position and/or direction of the vehicle lamp 1 of the present disclosure.

Figure 7:
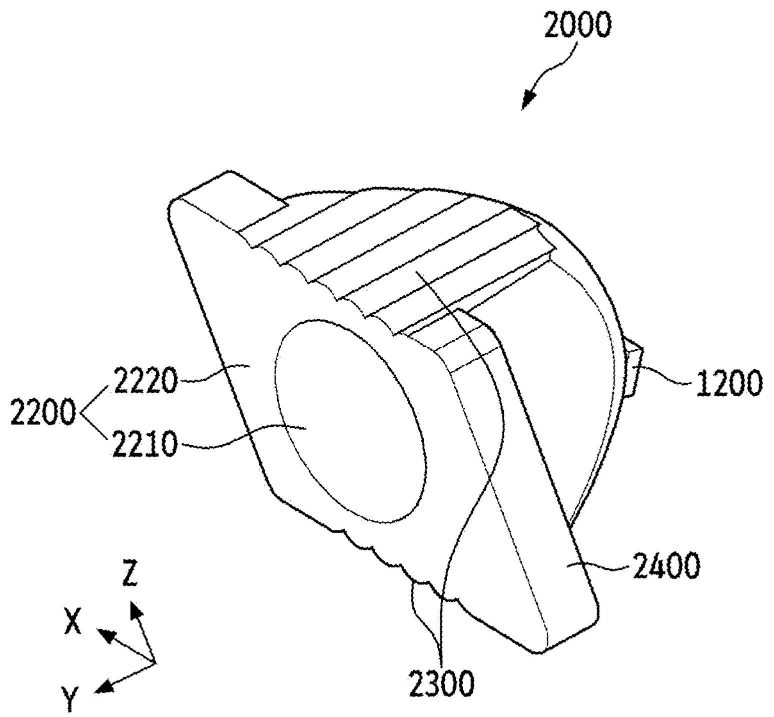
FIG. 7 is a perspective view of an adjusting lens according to an embodiment of the present disclosure.
Figure 8:
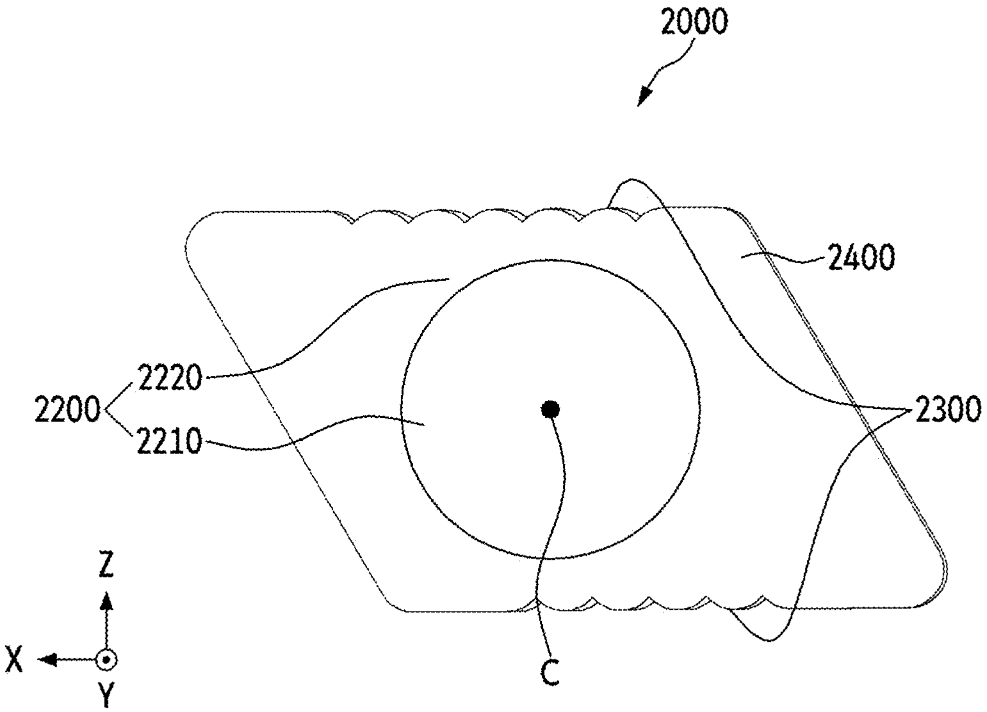
FIG. 8 is a front view of the adjusting lens according to the embodiment of the present disclosure.
Figure 9:
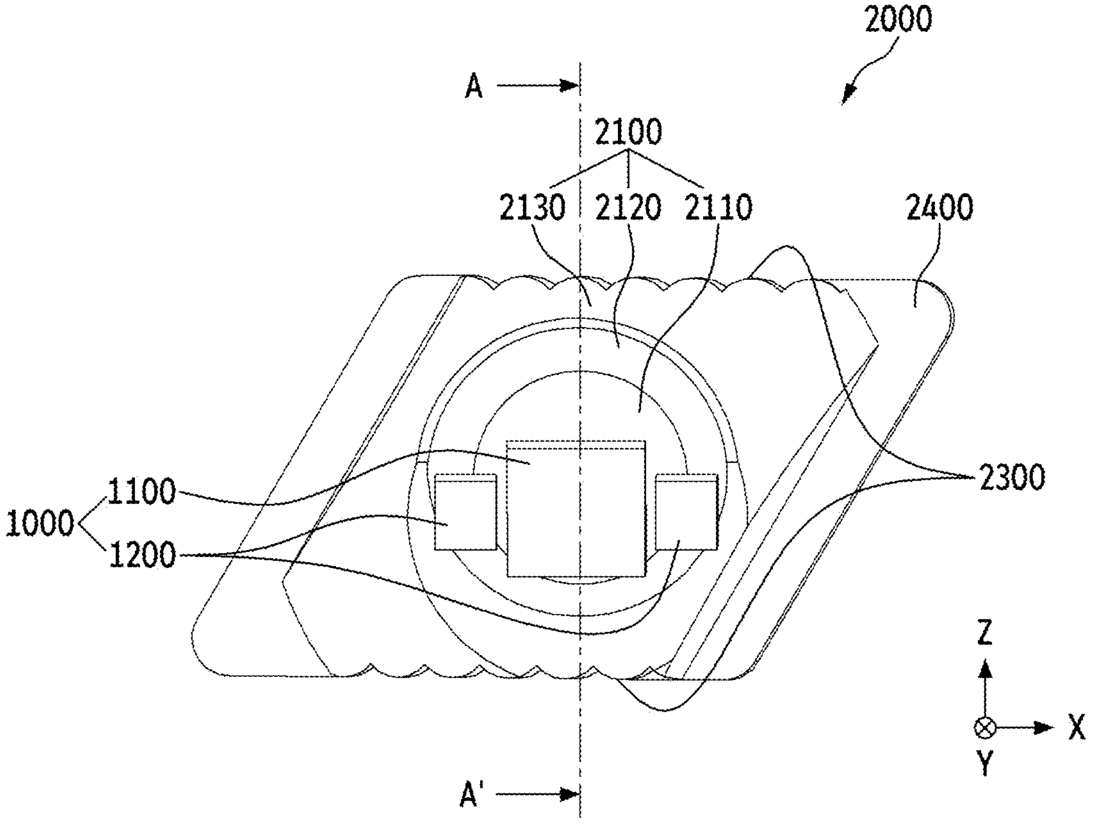
FIG. 9 is a rear view of the adjusting lens according to the embodiment of the present disclosure.
Figure 10:
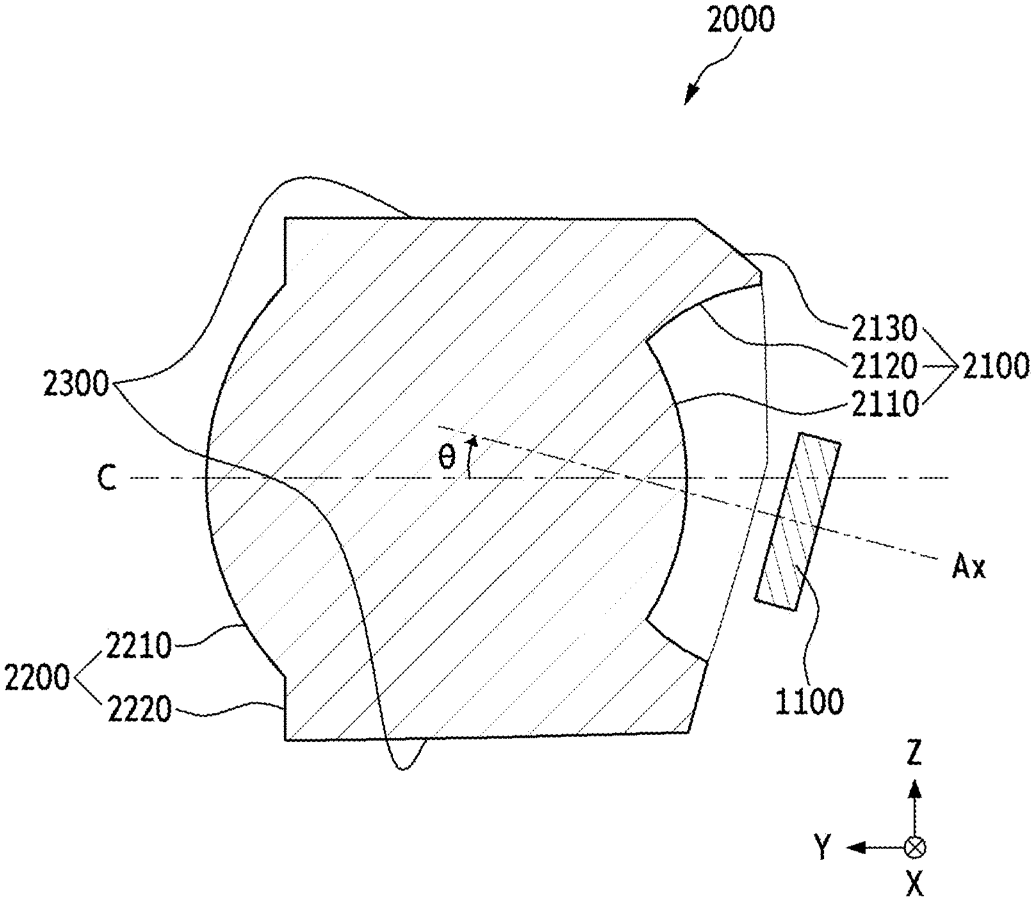
FIG. 10 is a cross-sectional view taken along line A-A' of FIG. 9.

FIG. 7 is a perspective view of an adjusting lens 2000 according to an embodiment of the present disclosure. FIG. 8 is a front view of the adjusting lens 2000 according to the embodiment of the present disclosure. FIG. 9 is a rear view of the adjusting lens 2000 according to the embodiment of the present disclosure. FIG. 10 is a cross-sectional view taken along line A-A' of FIG. 9. FIGS. 7 through 10 illustrate any one of the adjusting lenses 2000 as an example, and similar description may be applied for the other adjusting lenses 2000.

Referring to FIGS. 7 through 10, each of the plurality of adjusting lenses 2000 according to the embodiment of the present disclosure may include an incident portion 2100 and an exit portion 2200.

The incident portion 2100 may include a first incident surface 2110 which is formed convexly toward a corresponding light source module among the plurality of light source modules 1000, a second incident surface 2120 which is formed to protrude from a rim of the first incident surface 2110 toward the corresponding light source module, and a reflective surface 2130 which reflects the light incident on the second incident surface 2120 toward the exit portion 2200. At least a portion of an end portion of the incident portion 2100, which faces the corresponding light source module among the plurality of light source modules 1000, may be inclined at an angle corresponding to the tilt angle of the corresponding light source module among the plurality of light source modules 1000 to accommodate the tilting of the common substrate 1000*a*.

In other words, in the embodiment of the present disclosure, the common substrate 1000*a* is tilted such that the lower side is disposed more forward than the upper side. Therefore, an optical axis Ax of each of the plurality of light source modules 1000 may be tilted upward at a predetermined angle θ with respect to a central axis C of a corresponding adjusting lens among the plurality of adjusting lenses 2000. Accordingly, at least a portion of the end portion of the incident portion 2100 may be inclined such that a lower side of such a portion is disposed more forward than an upper side of the portion. The optical axis Ax may be understood as an axial line that passes perpendicularly through a center of an emission surface of each of the plurality of main light source 1100 and the sub-light sources 1200, and the central axis C may be understood as an axial line that is parallel to the front-back direction and passes through a center of the incident portion 2100 and a center of the exit portion 2200.

Here, since the main light source 1100 is disposed at the center of the incident portion 2100 in the left-right direction as shown in FIG. 9, the sub-light sources 1200 may be disposed symmetrically on both sides of the main light source 1100 in the left-right direction as described above, to allow the sub-beam pattern to have uniform brightness.

In the embodiment of the present disclosure, a case where the sub-light sources 1200 are disposed symmetrically on both sides of the main light source 1100 in the left-right direction is described as an example. However, this is merely an example used to help understand the present disclosure, and the present disclosure is not limited to this configuration. The sub-light sources 1200 may be disposed symmetrically on both sides of the main light source 1100 in at least one direction (e.g., the up-down direction) depending on the position of the main light source 1100.

The exit portion 2200 may include a first exit surface 2210 and a second exit surface 2220. In the embodiment of the present disclosure, a case where the first exit surface 2210 and the second exit surface 2220 are formed to have different curvatures will be described as an example. This is to ensure that the light incident on the incident portion 2100 is refracted at an appropriate refraction angle, so that the light incident on the incident portion 2100 can be converted into substantially parallel light and output along a direction parallel to the central axis C of the adjusting lens 2000.

For example, the first exit surface 2210 may be formed to be convex forward, and the second exit surface 2220 may be formed to be approximately flat. In this case, the light output through the first exit surface 2210 may be refracted at a relatively greater refraction angle.

In the embodiment of the present disclosure, a case where the first incident surface 2110 is formed to be convex backward toward a corresponding light source module among the plurality of light source modules 1000, and the first exit surface 2210 is formed to be convex forward and has a greater curvature than the first incident surface 2110 will be described as an example. However, this is merely an example used to help understand the present disclosure, and the present disclosure is not limited to this example. The formation angle and curvature of each of the first incident surface 2110, the second incident surface 2120, and the reflective surface 2130 and the formation angle and curvature of each of the first exit surface 2210 and the second exit surface 2220, which convert the light incident on the incident portion 2100 into substantially parallel light and output the parallel light, can be varied.

Each of the plurality of adjusting lenses 2000 may have a diffusion pattern 2300 formed on at least a portion of side surfaces that extend between the incident portion 2100 and the exit portion 2200 to diffuse light. In the embodiment of the present disclosure, a case where a knurling structure is formed as the diffusion pattern 2300 on the top and bottom surfaces among the side surfaces between the incident portion 2100 and the exit portion 2200 will be described as an example.

In the embodiment of the present disclosure, the diffusion pattern 2300 may be formed on the top and bottom surfaces of each of the plurality of adjusting lenses 2000 since the lamp modules are arranged in the up-down direction, the adjusting lenses 2000 are arranged in the up-down direction, and thus the light output from at least one of the top or bottom surfaces of each of the plurality of adjusting lenses 2000 is likely to be irradiated above the cutoff line CL of the low beam pattern P, thereby potentially causing glare.

Figure 11:
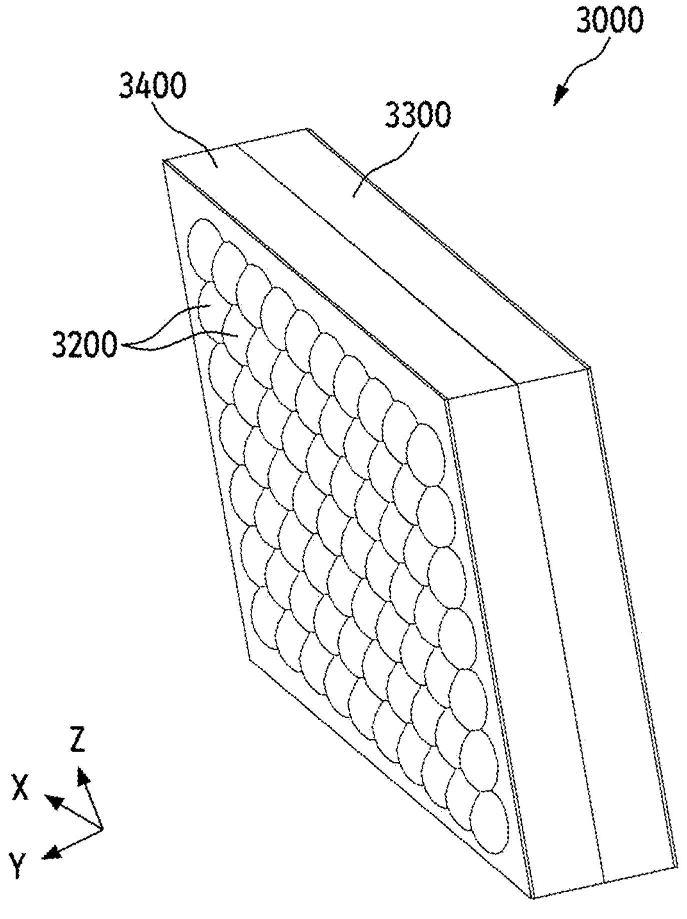
FIG. 11 is a perspective view of an optical lens according to an embodiment of the present disclosure.
Figure 12:
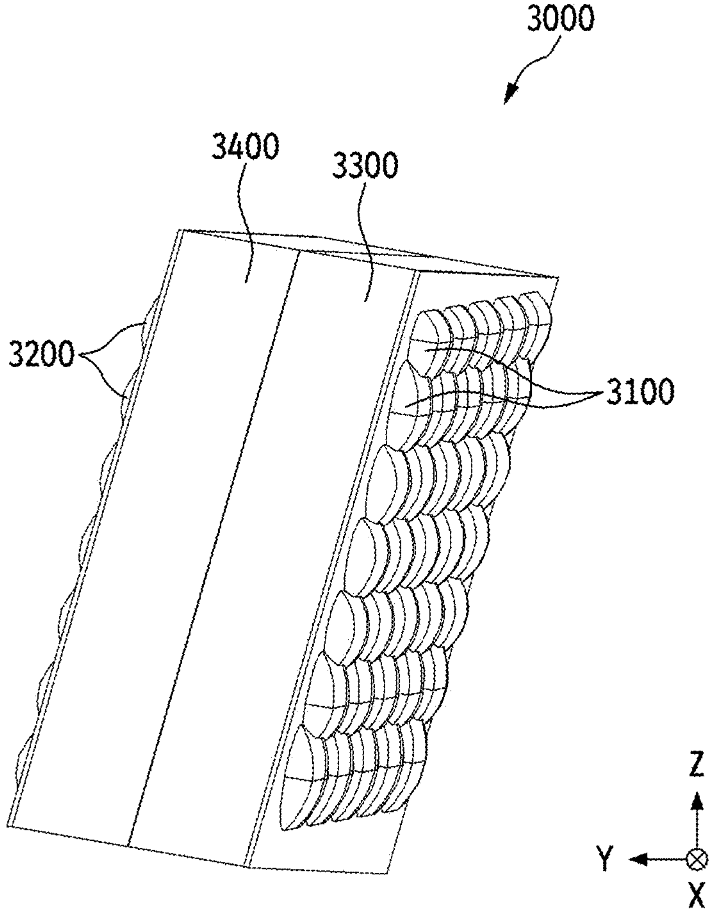
FIG. 12 is a side view of the optical lens according to the embodiment of the present disclosure.
Figure 13:
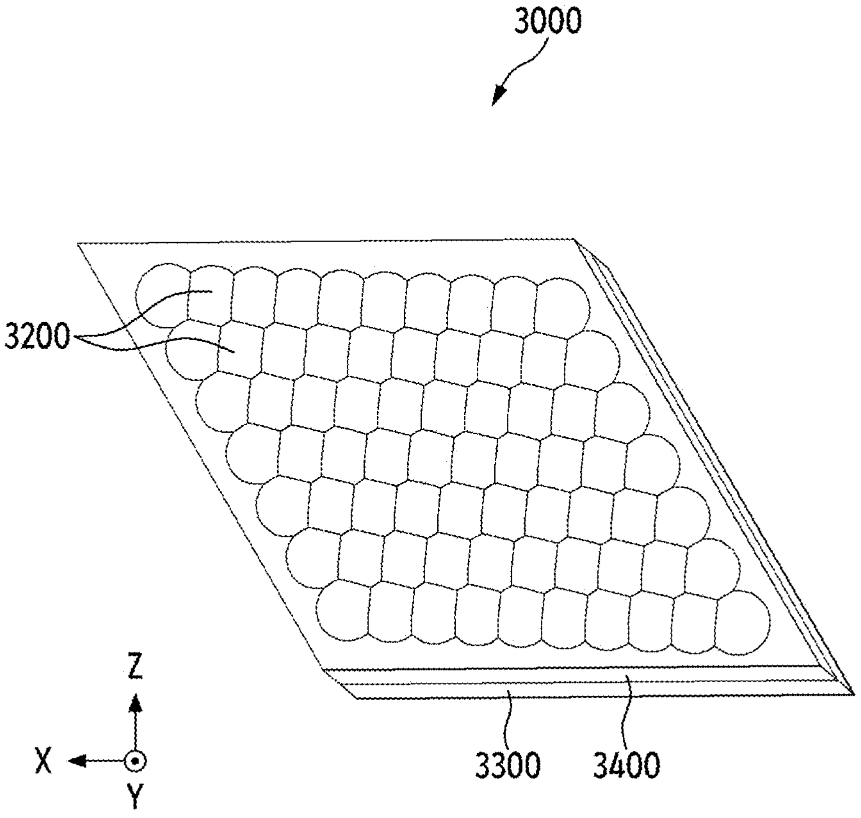
FIG. 13 is a front view of the optical lens according to the embodiment of the present disclosure.
Figure 14:
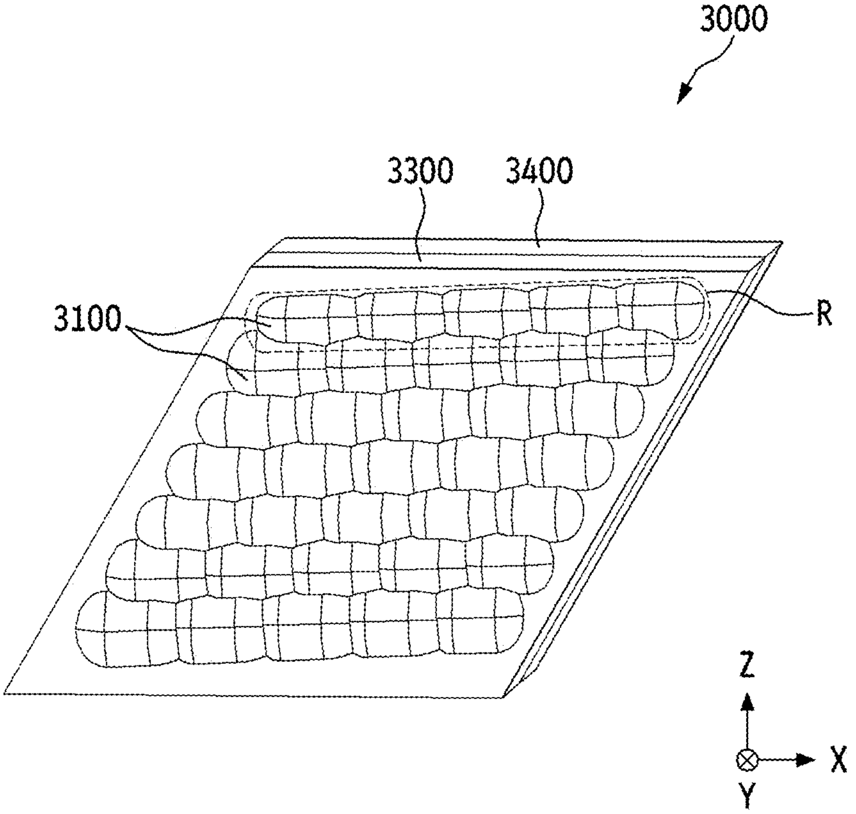
FIG. 14 is a rear view of the optical lens according to the embodiment of the present disclosure.
Figure 15:
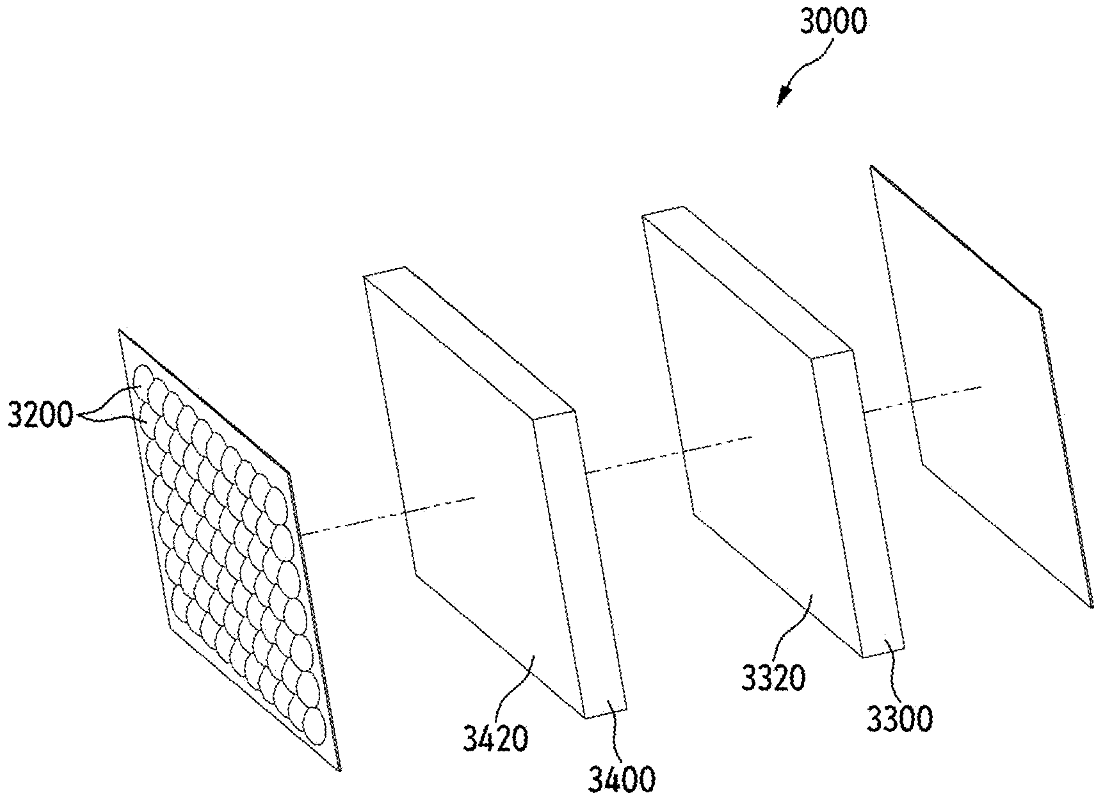
FIGS. 15 and 16 are exploded perspective views of the optical lens according to the embodiment of the present disclosure.
Figure 16:
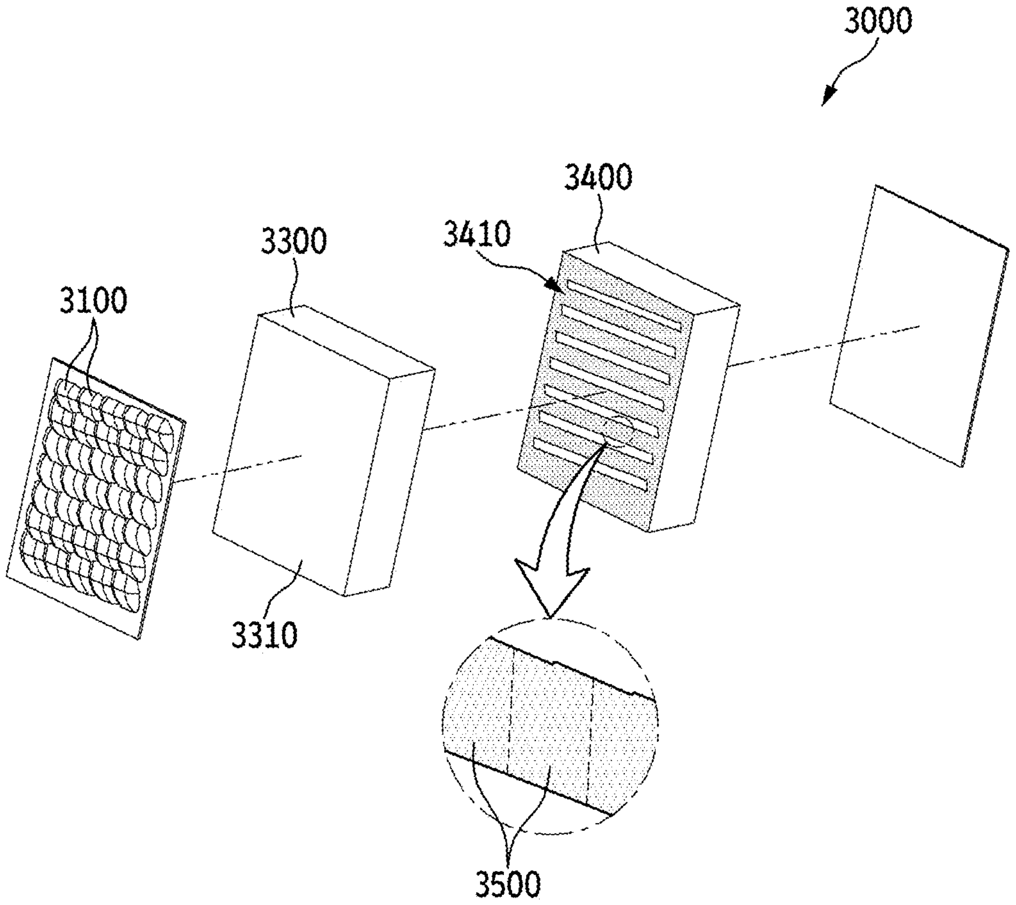
Figure 17:
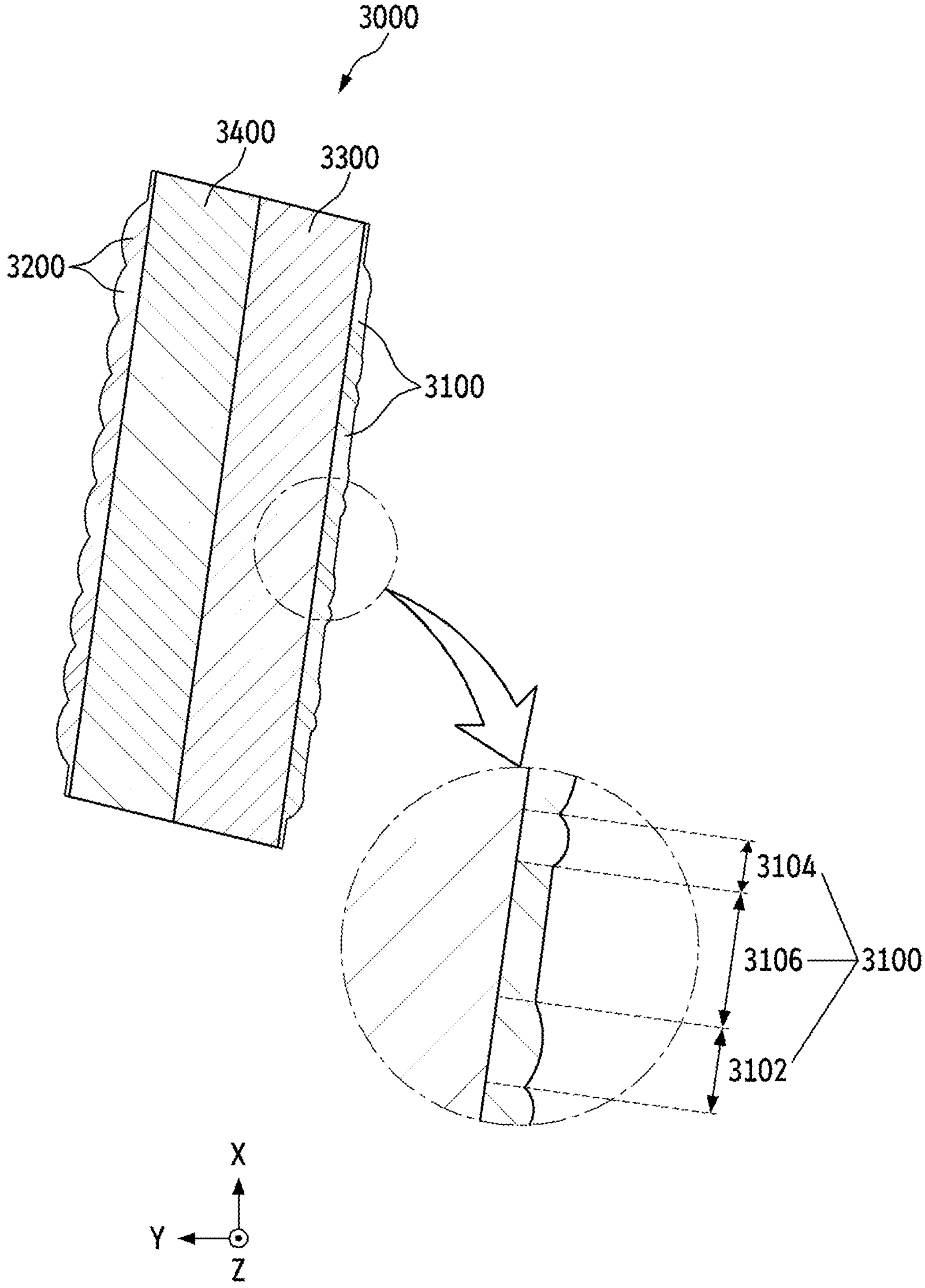
FIG. 17 is a cross-sectional view of the optical lens according to the embodiment of the present disclosure.

FIG. 11 is a perspective view of an optical lens 3000 according to an embodiment of the present disclosure. FIG. 12 is a side view of the optical lens 3000 according to the embodiment of the present disclosure. FIG. 13 is a front view of the optical lens 3000 according to the embodiment of the present disclosure. FIG. 14 is a rear view of the optical lens 3000 according to the embodiment of the present disclosure. FIGS. 15 and 16 are exploded perspective views of the optical lens 3000 according to the embodiment of the present disclosure. FIG. 17 is a cross-sectional top view of the optical lens 3000 according to the embodiment of the present disclosure. FIGS. 11 through 17 illustrate any one of the optical lenses 3000 as an example.

Referring to FIGS. 11 through 17, each of the plurality of optical lenses 3000 according to the embodiment of the present disclosure may include a plurality of incident lenses 3100 and a plurality of exit lenses 3200.

The incident lenses 3100 may be arranged on an incident surface 3310 of a first optical member 3300, and the exit lenses 3200 may be arranged on an exit surface 3420 of a second optical member 3400 disposed in front of the first optical member 3300. An exit surface 3320 of the first optical member 3300 and an incident surface 3410 of the second optical member 3400 may be disposed adjacent to each other to face each other or may be in contact with each other.

In the embodiment of the present disclosure, since the lamp modules are arranged more forward going from top to bottom and more to one side in the left-right direction, each of the plurality of optical lenses 3000 may be tilted such that a bottom side is disposed more forward than a top side in the up-and-down direction and, at the same time, may be inclined such that the bottom side is disposed more to one side in the left-right direction than the top side and may be tilted such that one side is disposed more forward than the other side in the left-right direction. Therefore, even if the lamp modules are disposed more forward in the front-back direction and more to one side in the left-right direction, going from top to bottom, the exit surfaces 3420 of the respective second optical members 3400 of the optical lenses 3000 as a whole may form a single exit surface without a step between the optical lenses 3000. Therefore, the exit lenses 3200 of each of the plurality of optical lenses 3000 may lie in substantially the same plane, thereby implementing an integrated and unified exterior design.

The light incident on each of the plurality of incident lenses 3100 may be output through a corresponding exit lens among the plurality of exit lenses 3200. In the embodiment of the present disclosure, a case where each of the plurality of incident lenses 3100 extends in the left-right direction, and the light incident on each of the plurality of incident lenses 3100 is output through two or more exit lenses adjacent to each other in the extending direction of the incident lenses 3100 among the plurality of exit lenses 3200 will be described as an example. However, the present disclosure is not limited to this case, and the incident lenses 3100 and the exit lenses 3200 may correspond to each other in a one-to-one, one-to-many, many-to-one, or many-to-many manner depending on the light distribution characteristics of a beam pattern to be formed by the vehicle lamp 1 of the present disclosure.

The incident lenses 3100 may be arranged such that lens rows R that form rows that extend in a first direction are arranged along a second direction intersecting the first direction. In the embodiment of the present disclosure, a case where the first direction is the left-right direction, and the second direction is the up-down direction will be described as an example.

In the embodiment of the present disclosure, at least one of the plurality of incident lenses 3100 and at least another of the plurality of incident lenses 3100 may be formed to have different curvatures in at least a portion thereof, so that different pattern areas within a beam pattern can be formed. This configuration enables each of the plurality of optical lenses 3000 to be commonly used even when different pattern areas are formed.

For example, conventional optical lenses generally use different incident lenses for forming the high-illumination area A1 of the low beam pattern P and for forming the spread area A2. In such a case, however, the optical lens must be manufactured individually depending on the light distribution characteristics of a pattern area. Accordingly, manufacturing processes and costs increase. On the other hand, in the embodiment of the present disclosure, the optical lens 3000 can be used in common both when the high-illumination A1 of the low beam pattern P is formed and when the spread area A2 is formed. Accordingly, the manufacturing processes can be reduced, and the manufacturing costs can be reduced.

In the embodiment of the present disclosure, each of the plurality of incident lenses 3100 may include a first incident area 3102, a second incident area 3104, and a third incident area 3106 disposed between the first incident area 3102 and the second incident area 3104.

Here, a case where the third incident area 3106 is implemented as a cylindrical lens that causes incident light to proceed as substantially parallel light, and the first incident area 3102 and the second incident area 3104 are respectively formed on both lateral sides of the third incident area 3106 as curved surfaces with predetermined curvatures to focus light in order to satisfy required light distribution characteristics will be described as an example.

In other words, the third incident area 3106 may be formed to have a curvature in the up-down direction, and no curvature in the left-right direction. Therefore, incident light may be refracted to be focused in the up-down direction, proceeds as parallel light in the left-right direction. Since the first incident area 3102 and the second incident area 3104 have a curved shape, the incident light thereto may be refracted to be collimated in the up-down direction and the left-right direction.

Figure 18:
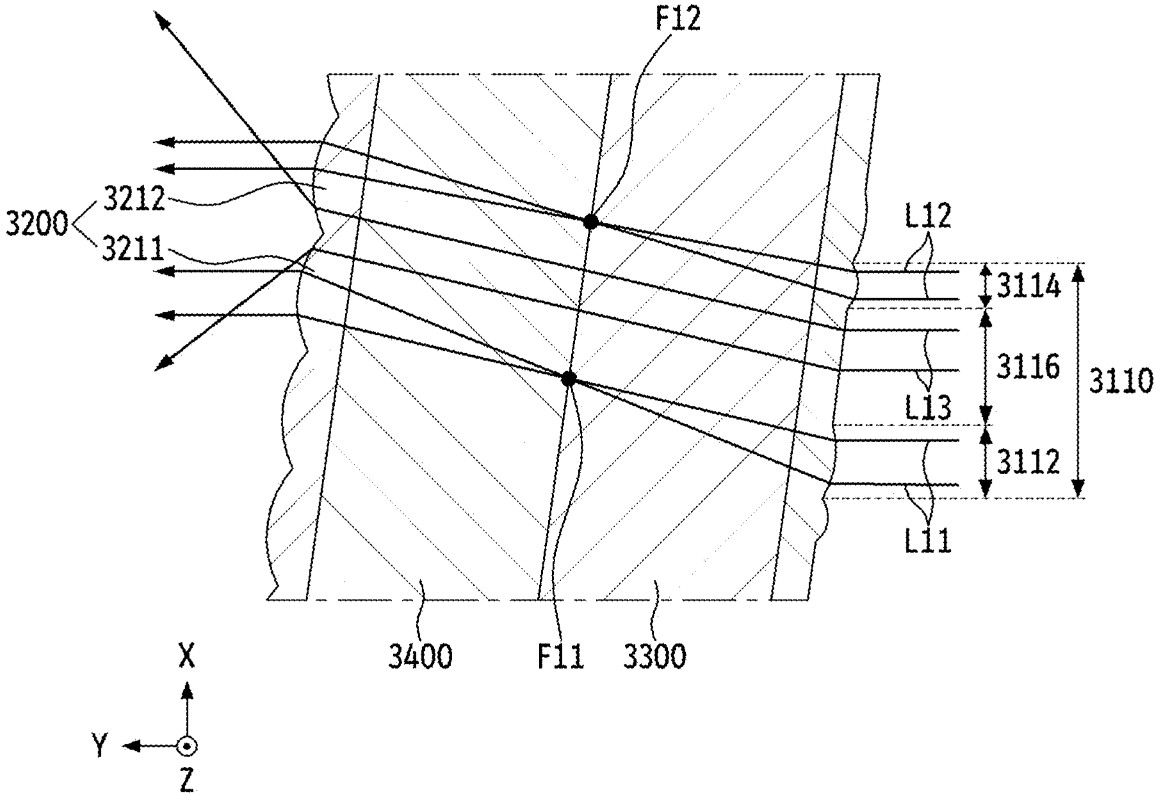
FIG. 18 is a schematic diagram illustrating optical paths by a first incident lens according to an embodiment of the present disclosure.
Figure 19:
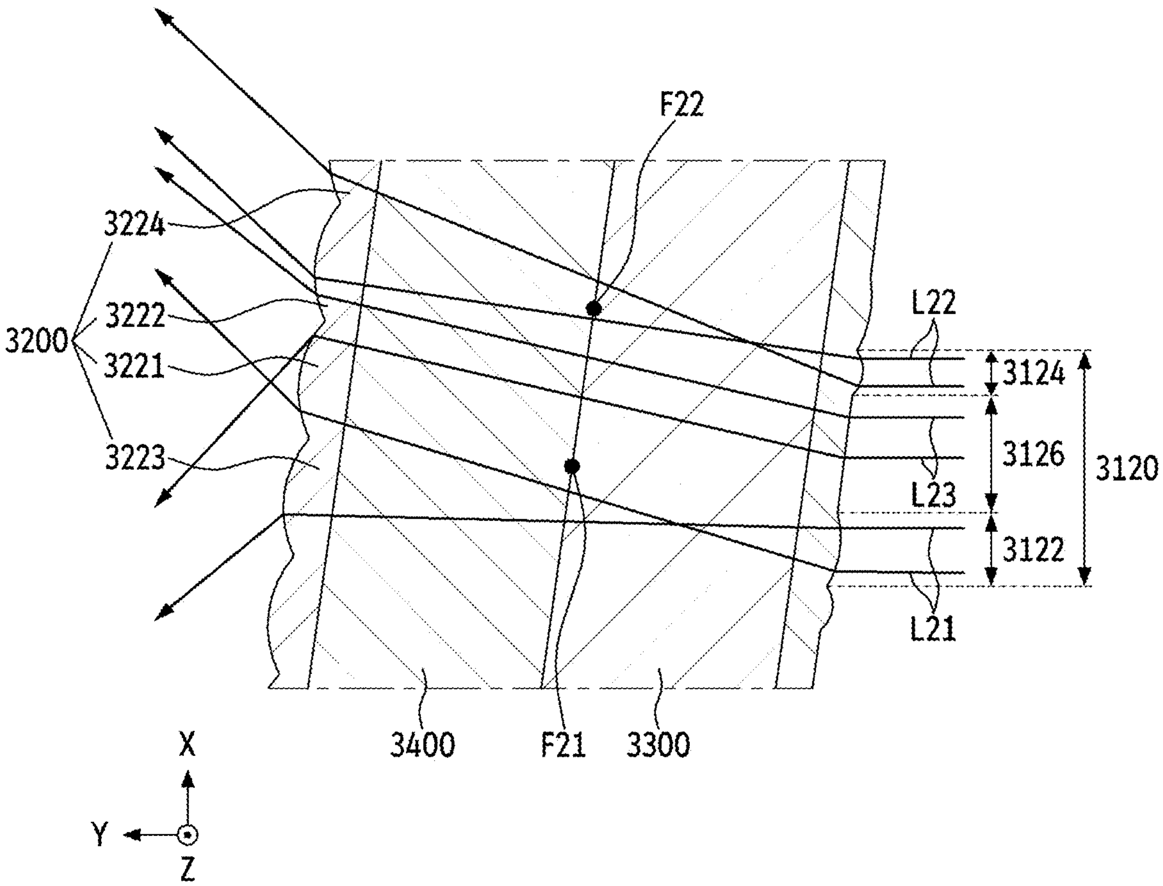
FIG. 19 is a schematic diagram illustrating optical paths by a second incident lens according to an embodiment of the present disclosure.

FIG. 18 is a schematic diagram illustrating optical paths by a first incident lens 3110 according to an embodiment of the present disclosure. FIG. 19 is a schematic diagram illustrating optical paths by a second incident lens 3120 according to an embodiment of the present disclosure.

Referring to FIGS. 18 and 19, the incident lenses 3100 of the present disclosure may include the first incident lens 3110 and the second incident lens 3120. In the embodiment of the present disclosure, the first incident lens 3110 and the second incident lens 3120 may be formed to have different curvatures in at least a portion, so that a first pattern area is formed by the first incident lens 3110, and a second pattern area is formed by the second incident lens 3120. Therefore, at least some of incident light may be refracted at different refraction angles.

The first incident lens 3110 may include, like the incident lenses 3100 described above, a first incident area 3112, a second incident area 3114, and a third incident area 3116 formed between the first incident area 3112 and the second incident area 3114.

Referring to FIG. 18, the first incident area 3112 and the second incident area 3114 of the first incident lens 3110 may be formed as curved surfaces each having a predetermined curvature. Accordingly, light L11 and L12 incident on the first incident area 3112 and the second incident area 3114, respectively, may be focused at rear focuses F11 and F12 of corresponding exit lenses 3211 and 3212 among the plurality of exit lenses 3200 to form the high-illumination area A1 of the low beam pattern P as the first pattern area. Light L13 incident on the third incident area 3116 of the first incident lens 3110 may proceed as approximately parallel light and may be diffused when output through the corresponding exit lenses 3211 and 3212. Therefore, the high-illumination area A1 of the low beam pattern P as the first pattern area can have a shape, size, or the like that satisfy required light distribution characteristics.

In the embodiment of the present disclosure, a rear focus may have the shape of a point, a line, a plane, a space, or any combinations thereof depending on the area where light is actually focused.

The second incident lens 3120 may include, like the incident lenses 3100, a first incident area 3122, a second incident area 3124, and a third incident area 3126.

Referring to FIG. 19, light L21 and L22 incident on the first incident area 3122 and the second incident area 3124, respectively, of the second incident lens 3120, unlike the light incident on the first incident area 3112 and the second incident area 3114 of the first incident lens 3110, may be configured not to proceed through rear focuses F21 and F22 of corresponding exit lenses 3221 and 3222 among the plurality of exit lenses 3200, thereby reaching not only the corresponding exit lenses 3221 and 3222 but also other adjacent exit lenses 3223 and 3224. Accordingly, the light L21 and L22 may be relatively more diffused when output, thereby forming the spread area A2 of the low beam pattern P as the second pattern area.

In addition, light L23 incident on the third incident area 3126 of the second incident lens 3120 may proceed as approximately parallel light, like the light incident on the third incident area 3116 of the first incident lens 3110 described above, and may be diffused when output through the corresponding exit lenses 3221 and 3222 to form the spread area A2 of the low beam pattern P as the second pattern area.

In other words, while the first incident area 3112 and the second incident area 3114 of the first incident lens 3110 form the high-illumination area A1, the first incident area 3122 and the second incident area 3124 of the second incident lens 3120 may form the spread area A2.

The shapes of the first incident lens 3110 and the second incident lens 3120 described above are merely an example used to help understand the present disclosure, and the present disclosure is not limited to this example. The first incident lens 3110 and the second incident lens 3120 may be formed to have different curvatures in at least a portion so that pattern areas having different light distribution characteristics can be formed.

For example, the first incident lens 3110 and the second incident lens 3120 may have different curvatures on both sides in at least one of the left-right direction or the up-down direction. For example, the first incident lens 3110 and the second incident lens 3120 may be formed such that the first incident areas 3112 and 3122, the second incident areas 3114 and 3124, and/or the third incident areas 3116 and 3126 have different curvatures in at least a portion.

Figure 20:
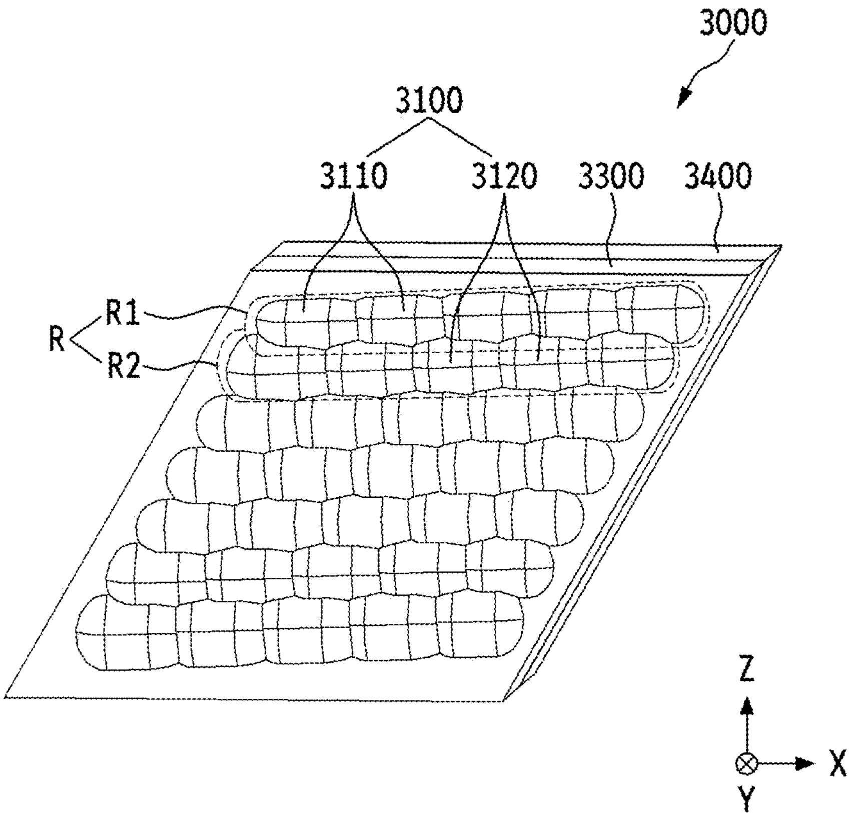
FIG. 20 is a schematic diagram illustrating lens rows formed by a plurality of incident lenses according to an embodiment of the present disclosure.

In the embodiment of the present disclosure, a case where the lens rows R include a first row R1 and a second row R2 arranged along the up-down direction as shown in FIG. 20 will be described as an example. Specifically, the first row R1 may be composed of the first incident lens 3110, and the second row R2 may be composed of the second incident lens 3120 so that the first row R1 and the second row R2 form different pattern areas. However, this is merely an example used to help understand the present disclosure, and the present disclosure is not limited to this case. Different incident lenses among the plurality of incident lenses 3100 may form different pattern areas.

In the embodiment of the present disclosure, two incident lenses having different curvatures in at least a portion among the plurality of incident lenses 3100 are referred to as the first incident lens 3110 and the second incident lens 3120. However, the present disclosure is not limited to this case, and the incident lenses 3100 may also include three or more incident lenses having different curvatures in at least a portion according to the number of pattern areas to be formed. Further, each of the first incident lens 3110 and the second incident lens 3120, as well as additional incident lenses, may be provided in plurality.

Figure 21:
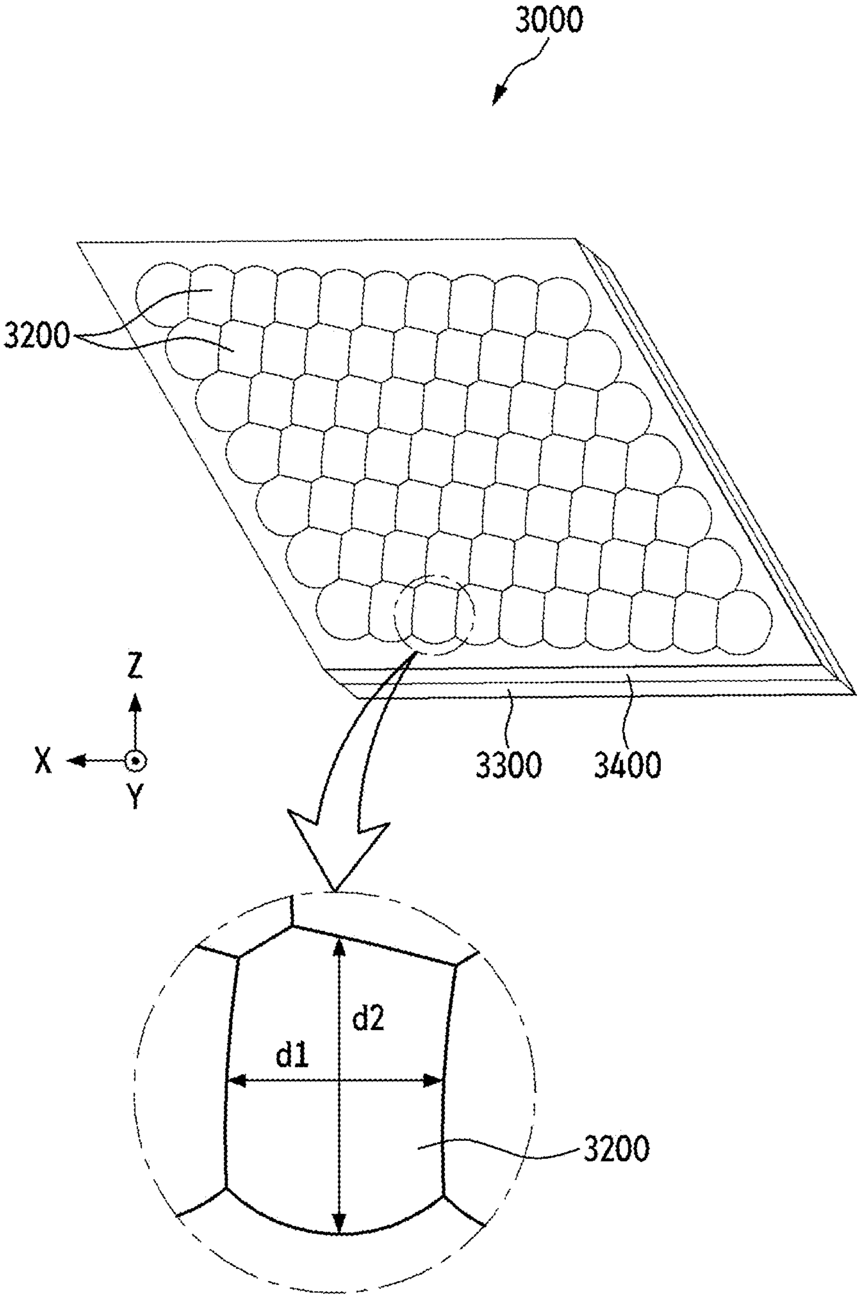
FIG. 21 is a schematic diagram illustrating the shape of a plurality of exit lenses according to an embodiment of the present disclosure.

The exit lenses 3200 may be formed such that a length d2 in the up-down direction (e.g., height) is greater than a length d1 in the left-right direction (e.g., width) as shown in FIG. 21. This configuration is to prevent the light incident on each of the plurality of incident lenses 3100 from being output in unnecessary directions by being incident not only on a corresponding exit lens among the plurality of exit lenses 3200 but also on other adjacent exit lenses. This feature will be described in detail later.

A plurality of shields 3500 may be disposed between the incident lenses 3100 and the exit lenses 3200. In the embodiment of the present disclosure, a case where the shields 3500 are formed on the incident surface 3410 of the second optical member 3400 by deposition will be described as an example. However, the present disclosure is not limited to this case, and the surface on which the shields 3500 are formed may vary.

Here, if positions of an exit lens and a shield corresponding to each other among the plurality of exit lenses 3200 and the plurality of shields 3500 are changed, it may be more difficult to properly block or obstruct the light that proceeds toward the exit lenses 3200. Therefore, the shields 3500 may be formed on the incident surface 3410 of the second optical member 3400.

The shields 3500 may be formed by depositing a light blocking material on the incident surface 3410 of the second optical member 3400 and removing the light blocking material from such areas where light needs to be transmitted, through a process such as laser etching.

Each of the plurality of shields 3500 may be formed such that its top edge extends horizontally to both sides from a center disposed at or near a rear focus of a corresponding exit lens among the plurality of exit lenses 3200 to allow the low beam pattern P having the cutoff line CL to be formed by the vehicle lamp 1 of the present disclosure.

In other words, the light that proceeds through a region below the rear focus of each of the plurality of exit lenses 3200 may be refracted relatively upward. Accordingly, the light may be irradiated above the cutoff line CL, thereby potentially causing glare. Hence, the light that proceeds through the region below the rear focus of each of the plurality of exit lenses 3200 may be blocked by the shields 3500.

In the embodiment of the present disclosure, a case where a step is formed between both sides of the center of each of the plurality of shields 3500 to allow the cutoff line CL of FIG. 6 described above to be formed by the shields 3500 will be described as an example. However, the present disclosure is not limited to this case, and no step may be included between both sides of the center, depending on the desired shape of the cutoff line CL.

In addition, in the embodiment of the present disclosure, a case where the top edge of each of the plurality of shields 3500 is formed horizontally in the left-right direction will be described as an example. However, this is merely an example used to help understand the present disclosure, and the present disclosure is not limited to this case. Depending on the light distribution characteristics of a beam pattern to be formed by the vehicle lamp 1 of the present disclosure, at least a portion of the top edge of each of the plurality of shields 3500 may also be inclined such that one side is disposed higher than the other side along the left-right direction, as shown in FIG. 16.

Here, each of the plurality of exit lenses 3200 may be formed such that the length d2 in the up-down direction is greater than the length d1 in the left-right direction as shown in FIG. 21 described above in order to prevent the light that passes through each of the plurality of shields 3500 from being emitted in unnecessary directions by being incident not only on a corresponding exit lens but also on other adjacent exit lenses.

Figure 22:
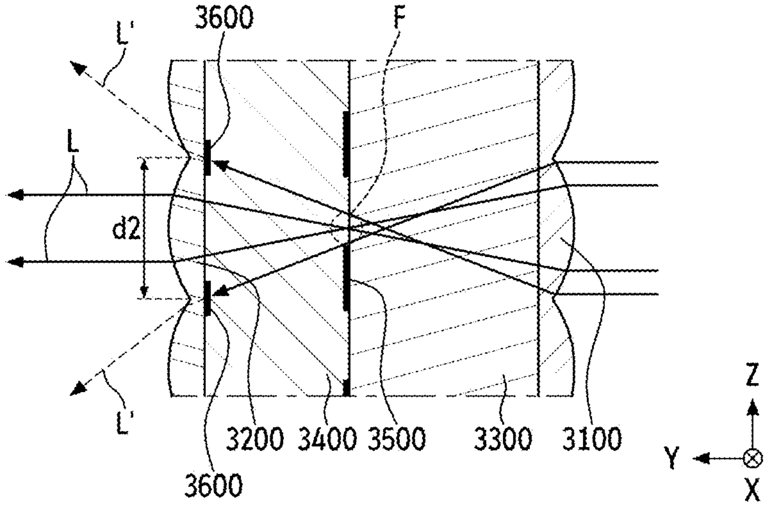
FIG. 22 is a schematic diagram illustrating optical paths corresponding to the shape of the exit lenses according to the embodiment of the present disclosure.
Figure 22:
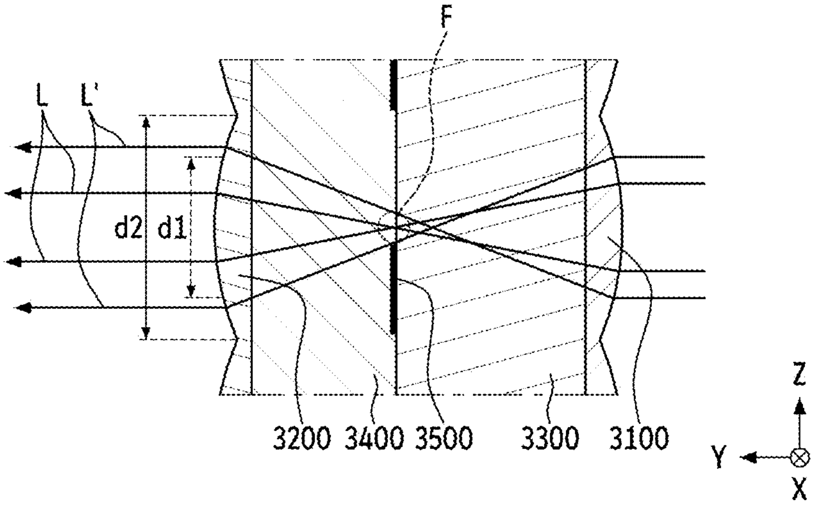

FIG. 22 is a schematic diagram illustrating optical paths corresponding to the shape of a plurality of exit lenses according to an embodiment of the present disclosure.

Referring to FIG. 22, when each of the plurality of exit lenses 3200 is formed such that the length d1 in the left-right direction is equal to the length d2 in the up-down direction, some L' of the light L and L' incident on each of the plurality of incident lenses 3100 may pass through a rear focus F of a corresponding exit lens among the plurality of exit lenses 3200 or near the rear focus F to enter not only the corresponding exit lens but also other exit lenses adjacent to the corresponding exit lens in the up-down direction. Since the light incident on the exit lenses adjacent to the corresponding exit lens in the up-down direction may cause glare, additional shields 3600 may need to be formed in addition to the shields 3500 in order to prevent glare. On the other hand, in the embodiment of the present disclosure, each of the plurality of exit lenses 3200 is formed such that the length d2 in the up-down direction is greater than the length d1 in the left-right direction. Therefore, without the formation of the additional shields 3600, the light that passes through each of the plurality of shields 3500 can be prevented from causing glare by being output through other exit lenses adjacent to a corresponding exit lens in the up-down direction among the plurality of exit lenses 3200.

Here, dotted arrows in FIG. 22 represent hypothetical optical paths in a case where the length d1 in the left-right direction is equal to the length d2 in the up-down direction and where the additional shields 3600 are not formed.

In other words, when light incident on each of the plurality of incident lenses 3100 is output not only through a corresponding exit lens among the plurality of exit lenses 3200 but also through other exit lenses horizontally adjacent to the corresponding exit lens, there is no concern for the light irradiating above the cutoff line CL causing glare. The light can instead be further diffused in the left-right direction as shown in FIG. 19 described above. However, when light incident on each of the plurality of incident lenses 3100 is output not only through a corresponding exit lens among the plurality of exit lenses 3200 but also through other exit lenses vertically adjacent to the corresponding exit lens, glare is likely to occur due to the light irradiated above the cutoff line CL. To prevent the glare, therefore, each of the plurality of exit lenses 3200 may be formed such that the length d2 in the up-down direction is greater than the length d1 in the left-right direction.

In addition, the exit lenses 3200 may be formed to have a diameter equal to or greater than ⅓ of a thickness of the second optical member 3400. Herein, the term "diameter" may refer to the diameter of a putative circular lens on which the rectangular exit lens 3200 is based. Thus, in some implementations, the term "diameter" may mean the diagonal length of the rectangular-shaped exit lens 3200. When the diameter of each of the plurality of exit lenses 3200 is less than ⅓ of the thickness of the second optical member 3400, the exit lenses 3200 may not have a sufficient size to form a beam pattern, and thus a beam pattern formed by the vehicle lamp 1 of the present disclosure may not satisfy required light distribution characteristics.

For example, if the diameter of each of the plurality of exit lenses 3200 is less than ⅓ of the thickness of the second optical member 3400, a beam pattern formed by light output from each of the plurality of exit lenses 3200 may not have a sufficient size to satisfy required light distribution characteristics. Therefore, the diameter of each of the plurality of exit lenses 3200 may be set to ⅓ or more of the thickness of the second optical member 3400.

The upper end (e.g., top edge) of one or more of the shields 3500 may have a different shape from the upper end of another one of the shields 3500. This is to ensure that the incident lenses 3100 include the first incident lens 3110 and the second incident lens 3120 to simultaneously form pattern areas with different light distribution characteristics.

For example, a shield corresponding to the first incident lens 3110 among the plurality of shields 3500 may be formed such that its top edge includes a step having a height difference in the up-down direction with respect to a center thereof, as shown in FIG. 16, in order to form the cutoff line CL as shown in FIG. 6 described above, and a shield corresponding to the second incident lens 3120 may be formed such that its top edge has a horizontal shape with no step.

The vehicle lamp 1 of the present disclosure described above may include a first holder 4000 for supporting the plurality of adjusting lenses 2000 and a second holder 5000 for supporting the plurality of optical lenses 3000. An adjusting lens and an optical lens corresponding to each other among the plurality of adjusting lenses 2000 and the plurality of optical lenses 3000 may be aligned with each other by the first holder 4000 and the second holder 5000.

The first holder 4000 may have a first opening 4100 formed to allow the light emitted from each of the plurality of light source modules 1000 to be incident on a corresponding adjusting lens among the plurality of adjusting lenses 2000 as shown in FIGS. 4 and 5. A mounting surface 4200, on which a flange portion 2400 that protrudes from a corresponding adjusting lens among the plurality of adjusting lenses 2000 is mounted, may be formed at both edges of the first opening 4100 which face each other. The flange portion 2400 of each of the plurality of adjusting lenses 2000 may be bonded and fixed to a corresponding mounting surface among a plurality of mounting surfaces 4200 of the first holder 4000 by an adhesive or the like.

The second holder 5000, like the first holder 4000, may include a second opening 5100 to allow the light output from each of the plurality of adjusting lenses 2000 to be incident on a corresponding optical lens among the plurality of optical lenses 3000.

Here, the second holder 5000 may have one or more mounting ribs 5200 which are configured to be inserted into one or more mounting grooves 4300 formed around the first opening 4100 of the first holder 4000. Like the flange portions 2400 and the mounting surfaces 4200 described above, the mounting grooves 4300 and the mounting ribs 5200 may be coupled and fixed by an adhesive or the like.

In some embodiments of the present disclosure, the adhesive may be a type that can be cured at a low temperature, has fast curing speed, and can be cured by curing light (such as ultraviolet light) that consumes less energy than heat drying. However, the present disclosure is not limited thereto, and in some embodiments, the flange portions 2400 and the mounting surfaces 4200 as well as the mounting grooves 4300 and the mounting ribs 5200 may be coupled by various coupling methods such as screw coupling, hook coupling, and fitting coupling, in addition to gluing with an adhesive.

Figure 23:
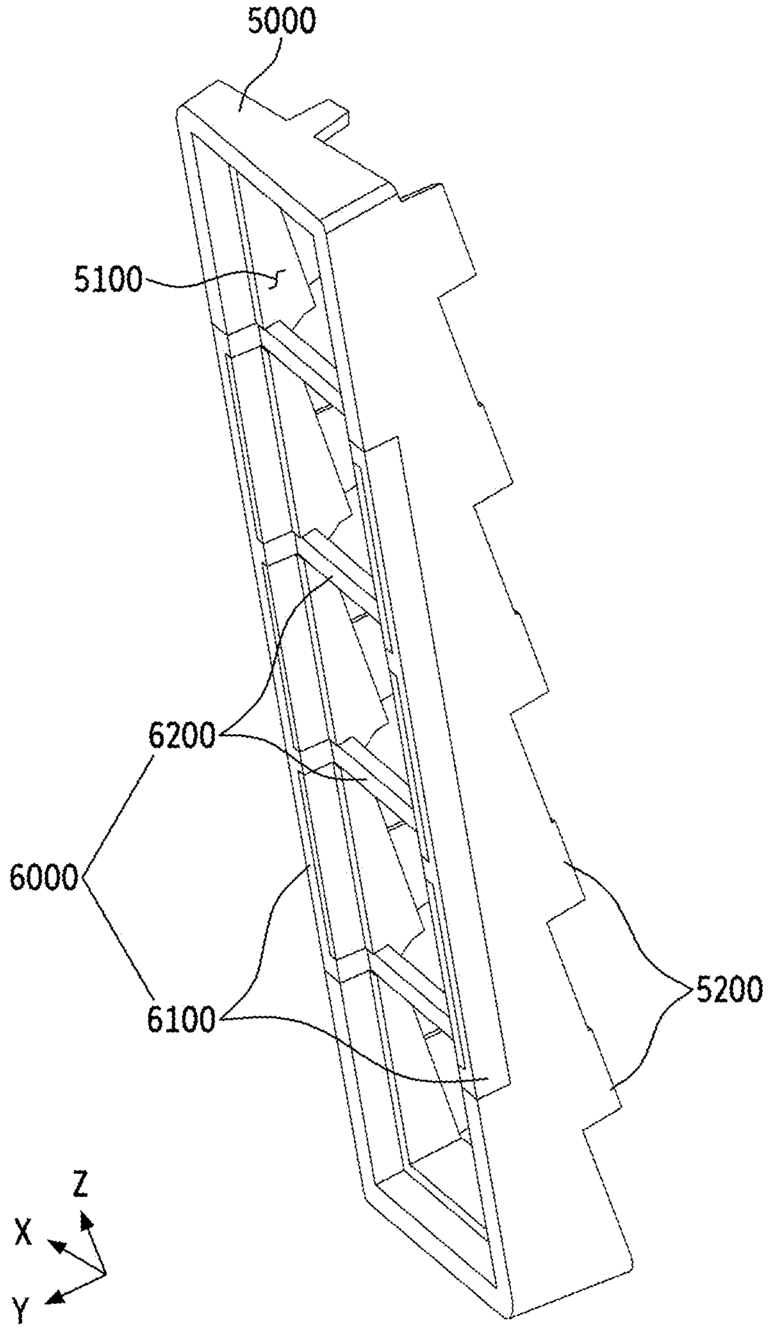
FIG. 23 is a perspective view of a second holder according to an embodiment of the present disclosure.
Figure 24:
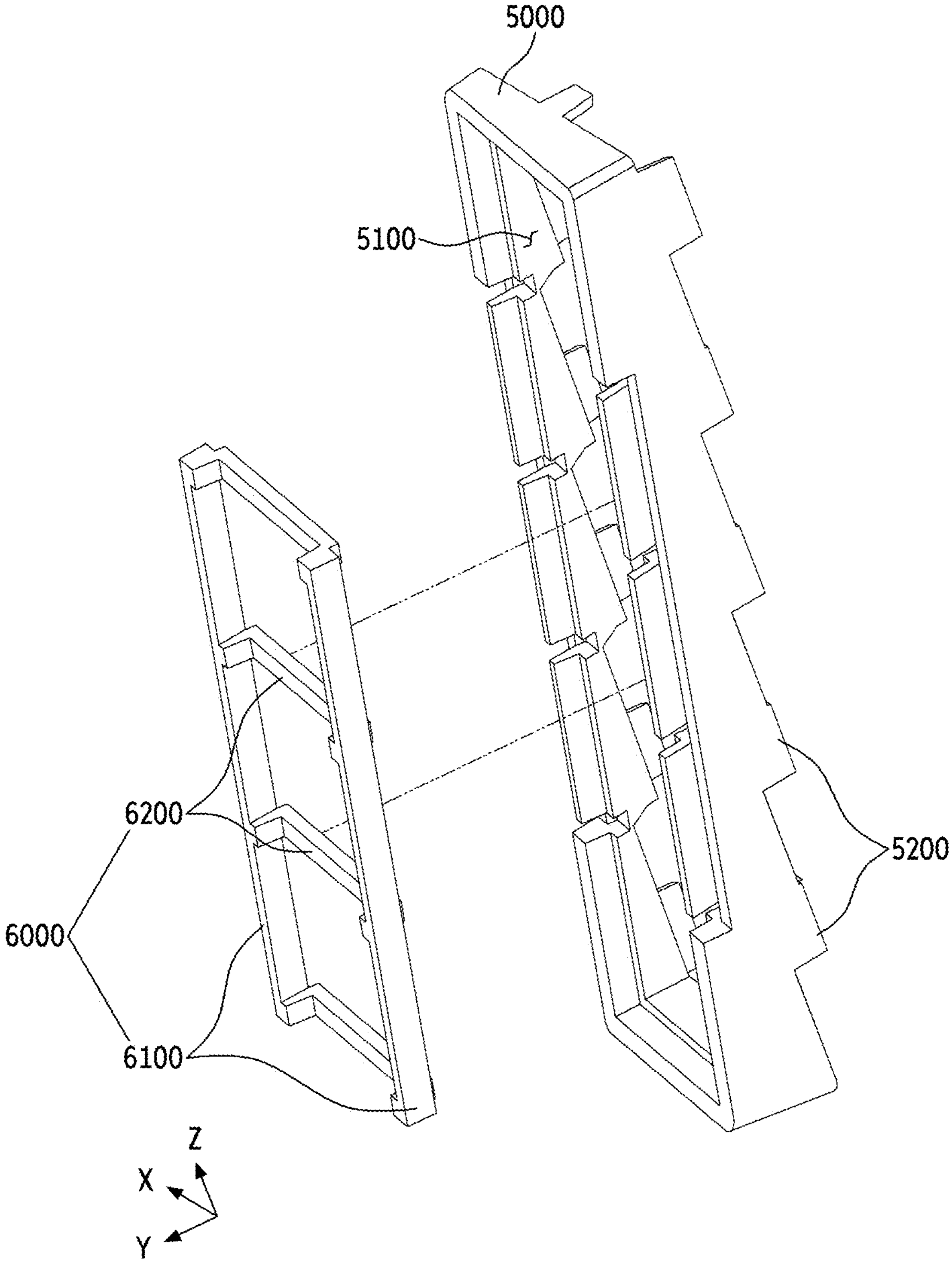
FIG. 24 is an exploded perspective view of the second holder according to the embodiment of the present disclosure.

FIG. 23 is a perspective view of a second holder 5000 according to an embodiment of the present disclosure. FIG. 24 is an exploded perspective view of the second holder 5000 according to the embodiment of the present disclosure.

Referring to FIGS. 23 and 24, the second holder 5000 may have an optical element 6000 which prevents the interior from being visible due to a gap between adjacent optical lenses among the plurality of optical lenses 3000 while promoting a sense of coherence and preventing light from being irradiated in unnecessary directions.

In other words, adjacent optical lenses among the plurality of optical lenses 3000 may be spaced apart by a predetermined distance to prevent the occurrence of tolerance or structural interference during manufacturing or assembly. In this case, depending on the size of the gap between the adjacent optical lenses among the plurality of optical lenses 3000, the interior may be visible, or a visual sense of discontinuity may occur, and furthermore, light may be irradiated in unnecessary directions. Therefore, the optical element 6000 may be provided to prevent the interior from being visible while promoting a sense of coherence and preventing light from being irradiated in unnecessary directions.

The optical element 6000 may include a different material from the second holder 5000 and may be formed integrally with the second holder 5000 by an insert injection process.

In the embodiment of the present disclosure, the second holder 5000 may include a light blocking material to prevent light from traveling in unnecessary directions and prevent light leakage. In addition, the optical element 6000 may include a light transmitting material to prevent the optical element 600 from forming unnecessary shadows and reducing light efficiency by blocking light.

The optical element 6000 may include a plurality of support frames 6100 disposed around both edges of the second opening 5100 of the second holder 5000, which face each other, and one or more connecting frames 6200 that connect the support frames 6100. Each of the one or more connecting frames 6200 may be disposed between adjacent optical lenses among the plurality of optical lenses 3000 to change the path of light that proceeds between the adjacent optical lenses, thereby preventing glare potentially caused by the light irradiated in unnecessary directions.

Here, changing the path of light using each of the one or more connecting frames 6200 may mean changing the path of light to at least one direction different from a direction in which the light is incident on each of the one or more connecting frames 6200. This may include a case where the light is refracted in a single direction different from the direction in which the light is incident on each of the one or more connecting frames 6200 and a case where the light is refracted in two or more directions different from the direction in which the light is incident on each of the one or more connecting frame 6200.

At least one surface of each of the one or more connecting frames 6200 may be treated for corrosion, and/or an optical pattern for diffusing light may be formed on at least one surface. The optical pattern may be formed by surface processing each of the one or more connecting frames 6200 or may be formed on a separate sheet and then attached to the connecting frames 6200.

Figure 25:
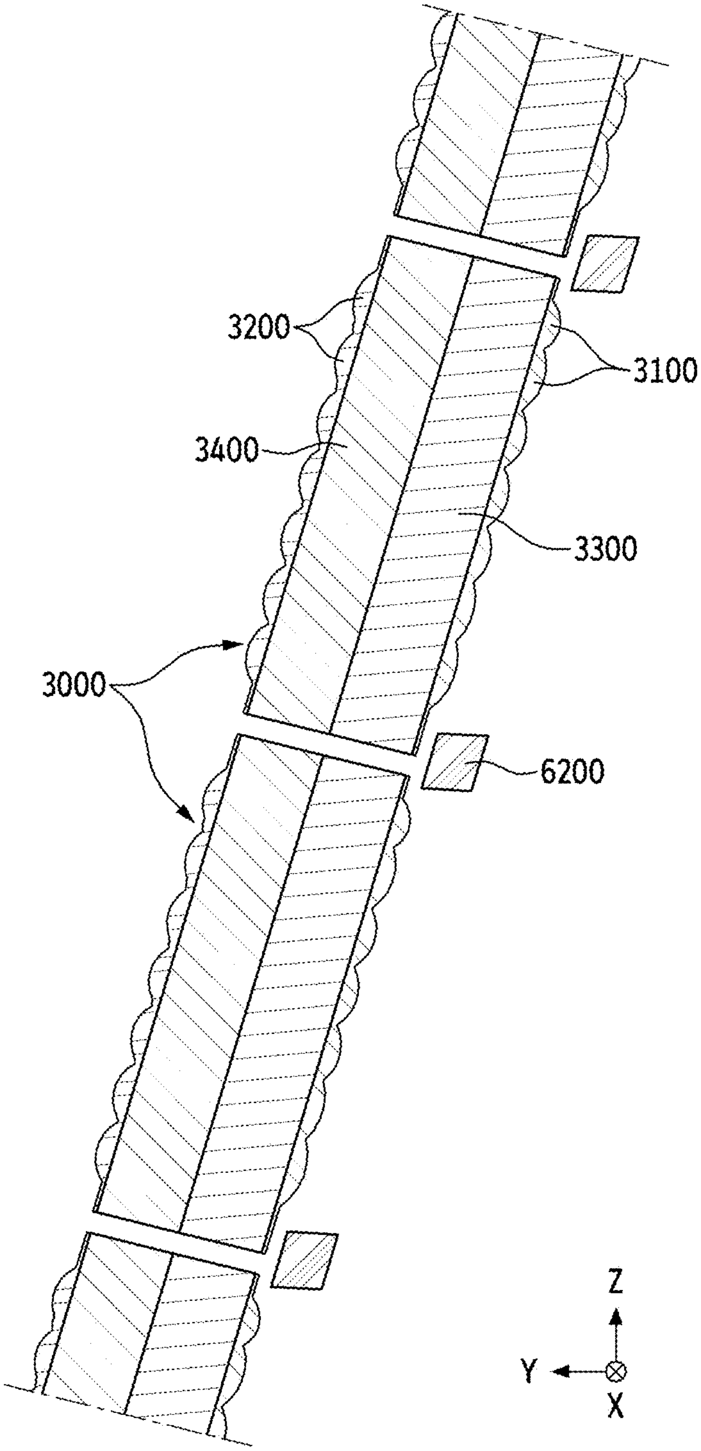
FIG. 25 is a cross-sectional view illustrating a connecting frame located between adjacent optical lenses among a plurality of optical lenses according to an embodiment of the present disclosure.

For example, each of the one or more connecting frames 6200 may have at least one of a light incident surface or a light exit surface treated for corrosion. Alternatively or additionally, an optical pattern for diffusing light may be formed on at least one of the light incident surface or the light exit surface. Accordingly, as shown in FIG. 25, the interior can be shielded from being visible from the exterior, and a visual sense of difference can be prevented. In addition, light that proceeds through a gap between adjacent optical lenses among the plurality of optical lenses 3000 can be prevented from being diffused by the connecting frames 6200, causing glare.

As described above, the vehicle lamp 1 of the present disclosure may include the optical element 6000 which is integrally formed in the second holder 5000 for supporting the optical lenses 3000. Therefore, a process for individually assembling the connecting frames 6200 can be omitted, thereby simplifying the assembly process and improving productivity.

Figure 26:
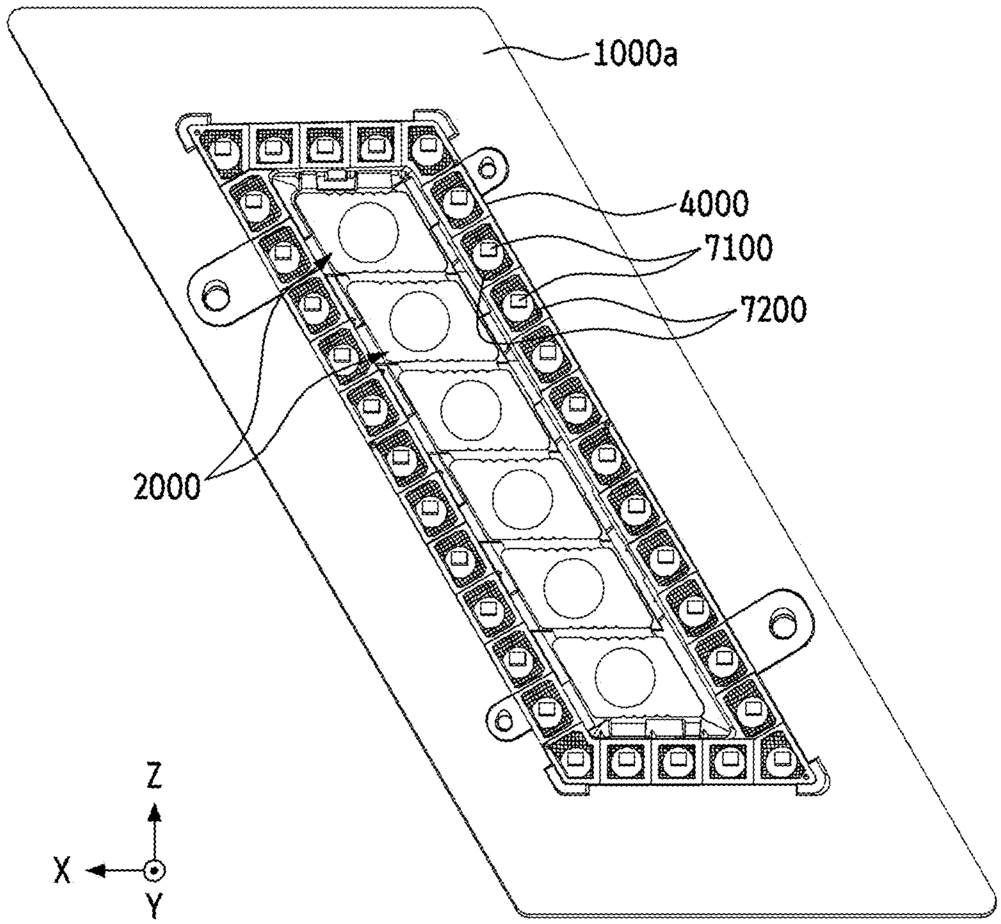
FIG. 26 is a front view illustrating a first holder having one or more reflectors according to an embodiment of the present disclosure.

The vehicle lamp 1 of the present disclosure may include one or more additional light sources 7100 installed on the common substrate 1000*a*, in addition to the light source modules 1000. As shown in FIG. 26, the first holder 4000 may include one or more reflectors 7200 which reflect the light from the additional light sources 7100 forward. The light reflected by the reflectors 7200 may be collected by one or more collecting lenses 7300. The collecting lenses 7300 may be supported by the first holder 4000 such that they are disposed in front of the reflectors 7200. The light collected by the collecting lenses 7300 may be irradiated to the exterior of the vehicle through a transmission lens 7400, which is disposed in front of the collecting lenses 7300, and may form an additional beam pattern.

In the embodiment of the present disclosure, the additional beam pattern may be a beam pattern different from the main beam pattern and the sub-beam pattern described above or may be the same beam pattern as the main beam pattern or the sub-beam pattern.

For example, if the additional beam pattern is the same beam pattern as the sub-beam pattern, when the main beam pattern is not formed, the sub-beam pattern may be formed by the optical lenses 3000 and the transmission lens 7400. When the main beam pattern is formed, the main beam pattern and the sub-beam pattern along the perimeter of the main beam pattern may be formed.

Figure 27:
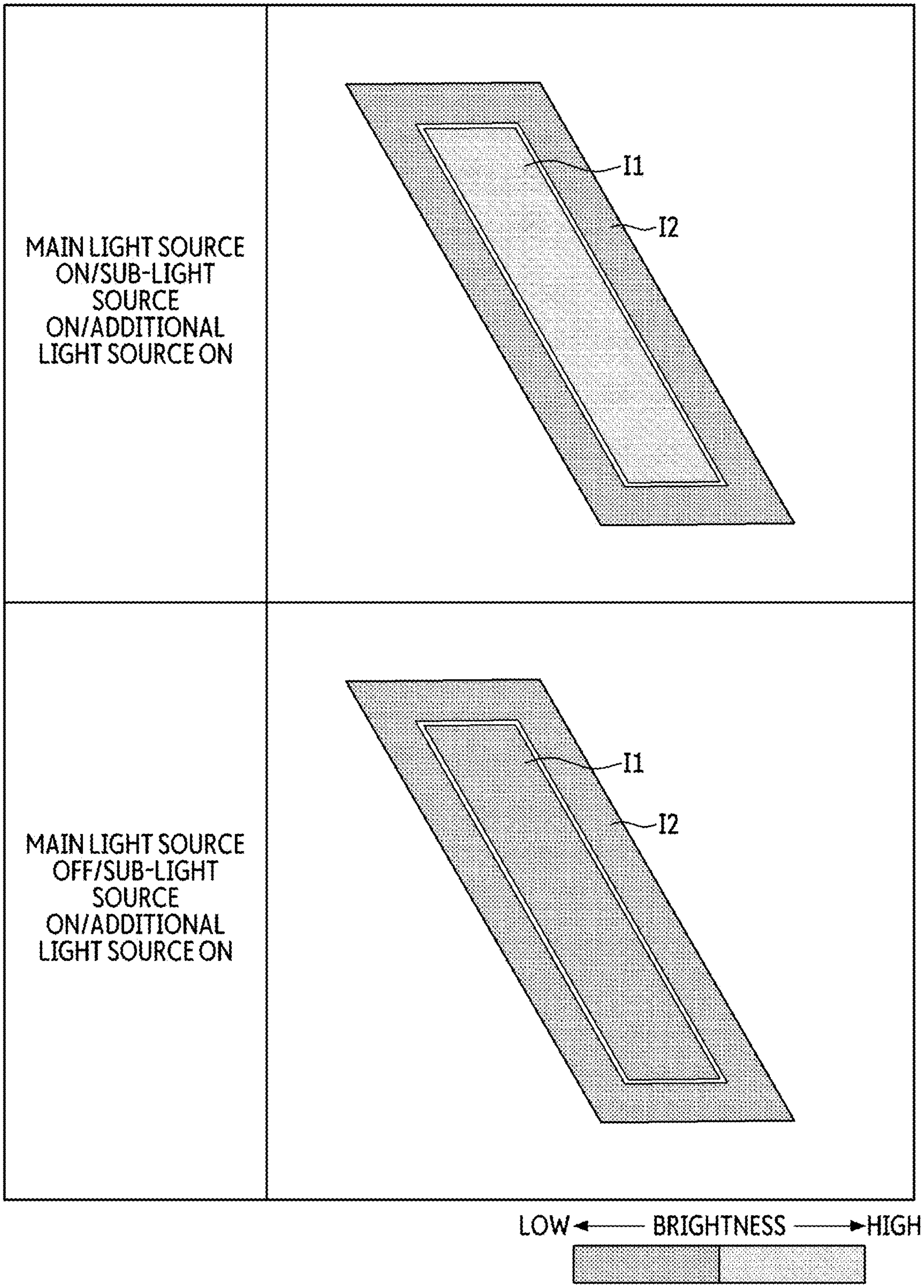
FIG. 27 is a schematic diagram illustrating lighting images formed by the vehicle lamp according to the embodiment of the present disclosure.

In the embodiment of the present disclosure, a case where the main beam pattern is used to secure the driver's view, the sub-beam pattern is used to inform the driving state of the vehicle, and the main beam pattern has a higher amount of light than the sub-beam pattern is described as an example. Therefore, when the main light sources 1100, the sub-light sources 1200, and the additional light sources 7100 are turned on simultaneously as shown in FIG. 27, a lighting image I1 formed by the light output from the optical lenses 3000 may exhibit a higher brightness than a lighting image I2 formed by the light output from the transmission lens 7400. On the other hand, when the sub-light sources 1200 and the additional light sources 7100 are turned on while the main light sources 1100 are turned off, the lighting image I1 formed by the light output from the optical lenses 3000 may exhibit a similar or substantially equal brightness as the lighting image I2 formed by the light output from the transmission lens 7400.

Here, when the main light sources 1100 are turned on, the sub-light sources 1200 may be turned on to improve the driver's view. However, the present disclosure is not limited to this case. When the main light sources 1100 are turned on, the sub-light sources 1200 may be turned off.

The formation of the additional beam pattern by the vehicle lamp 1 of the present disclosure is merely an example used to help understand the present disclosure, and the present disclosure is not limited to this case. The elements 7100, 7200, 7300, and 7400 for forming the additional beam pattern may be omitted.

The vehicle lamp 1 of the present disclosure described above may be accommodated in a housing 8000, and elements for forming the main beam pattern, the sub-beam pattern, and the additional beam pattern may be accommodated in the housing 8000.

In the embodiment of the present disclosure, a case where the housing 8000 includes a first sub-housing 8100 fixed to the common substrate 1000*a* and a second sub-housing 8200 disposed in front of the first sub-housing 8100 is described as an example. This is to place the optical lenses 3000 in the first sub-housing 8100 and place the transmission lens 7400 at a front end of the first sub-housing 8100 in order to prevent structural interference between the optical lenses 3000 and the transmission lens 7400. The transmission lens 7400 may include one or more fixing grooves 7410 into which one or more fixing protrusions 8110 formed at the front end of the first sub-housing 8100 are configured to be inserted. Therefore, the optical lenses 3000 and the transmission lens 7400 may be aligned with each other.

In addition, the transmission lens 7400 may include a grid-shaped pattern formed on a light exit surface thereof to have a shape similar to that of the exit lenses 3200 formed in the optical lenses 3000. Accordingly, a sense of incoherence between the optical lenses 3000 and the transmission lens 7400 can be reduced, thereby providing an overall unified appearance.

Here, a case where the first sub-housing 8100 and the second sub-housing 8200 are hook-coupled to each other by one or more coupling protrusions 8120 and one or more coupling grooves 8210 is described as an example. However, the present disclosure is not limited to this case, and the first sub-housing 8100 and the second sub-housing 8200 may also be coupled to each other by various methods such as screw coupling and an adhesive, in addition to hook coupling.

As described above, in the vehicle lamp 1 of the present disclosure, two or more of the incident lenses 3100 of each of the plurality of optical lenses 3000 may have different curvatures in at least a portion. Therefore, the optical lenses 3000 can be commonly used even when different pattern areas are to be formed by the lamp modules, respectively. This feature reduces manufacturing processes and costs.

In addition, the vehicle lamp 1 of the present disclosure includes the optical element 6000 disposed between adjacent optical lenses among the plurality of optical lenses 3000. Therefore, the interior space can be prevented from being seen, and a visual sense of difference can be prevented. In addition, light can be prevented from being irradiated in unnecessary directions through a space between the adjacent optical lenses. Furthermore, since the optical element 6000 can be integrally formed in the second holder 5000 that supports the optical lenses 3000, the assembly process can be simplified.

In concluding the detailed description, those skilled in the art will appreciate that many variations and modifications can be made to the exemplary embodiments without substantially departing from the principles of the present disclosure. Therefore, the disclosed embodiments should be used in a generic and descriptive sense only and not for purposes of limitation.

What is claimed is:

1. A vehicle lamp comprising:

a plurality of light source modules arranged in at least one direction;

a plurality of adjusting lenses that guide light emitted from each of the plurality of light source modules so as to adjust a path of the light; and a plurality of optical lenses that are tilted such that a first end is disposed more forward than a second end in at least one direction and output at least a portion of light, which is guided by and incident from each of the plurality of adjusting lenses, to form a predetermined beam pattern, wherein each of the plurality of optical lenses comprises:

an incident lens portion comprising a plurality of incident lenses; and an exit lens portion comprising a plurality of exit lenses corresponding to the incident lenses, wherein each of the plurality of adjusting lenses comprises:

an incident portion to which light emitted from a corresponding light source module among the plurality of light source modules is incident; and an exit portion from which the light incident on the incident portion is output, and wherein a diffusion pattern is formed on at least part of side surfaces that extend between the incident portion and the exit portion to diffuse light.

2. The vehicle lamp of claim 1, wherein each of the plurality of light source modules comprises:

a main light source that emits light for forming a main beam pattern; and sub-light sources that emit light for forming a sub-beam pattern, wherein the sub-light sources are disposed symmetrically at both sides of the main light source along at least one direction.

3. The vehicle lamp of claim 2, wherein the main light source is disposed at a center of a corresponding adjusting lens among the plurality of adjusting lenses in one direction.

4. The vehicle lamp of claim 1, wherein an optical axis of each of the plurality of light source modules is tilted in at least one direction with respect to a central axis of a corresponding adjusting lens among the plurality of adjusting lenses.

5. The vehicle lamp of claim 1, wherein the plurality of light source modules are installed on a common substrate.

6. The vehicle lamp of claim 5, wherein the common substrate is tilted such that a first end thereof is disposed more forward than a second end thereof in the at least one direction, and the plurality of light source modules are tilted at an angle corresponding to a tilt angle of the common substrate.

7. The vehicle lamp of claim 1, wherein the incident portion comprises:

a first incident surface formed convexly toward a corresponding light source module among the plurality of light source modules;

a second incident surface formed to protrude from peripheral edges of the first incident surface toward the corresponding light source module; and a reflective surface that reflects light, which is incident on the second incident surface, toward the exit portion.

8. The vehicle lamp of claim 1, wherein the exit portion comprises a plurality of exit surfaces having different curvatures.

9. The vehicle lamp of claim 1, wherein the incident lens portion further comprises a first optical member including the plurality of incident lenses on an incident surface thereof, wherein the exit lens portion further comprises a second optical member disposed in front of the first optical member and including the plurality of exit lenses on an exit surface thereof, and wherein an exit surface of the first optical member and an incident surface of the second optical member face each other.

10. The vehicle lamp of claim 1, wherein at least one of the plurality of incident lenses and at least another of the plurality of incident lenses have different curvatures in at least a portion thereof.

11. The vehicle lamp of claim 10, wherein the plurality of incident lenses comprise:

a first incident lens that forms a first pattern area of the predetermined beam pattern; and a second incident lens that forms a second pattern area of the predetermined beam pattern, wherein the first incident lens and the second incident lens have different curvatures in at least a portion thereof.

12. The vehicle lamp of claim 11, wherein the plurality of incident lenses are arranged such that a plurality of lens rows each formed to extend in a first direction are arranged in a second direction intersecting the first direction, and the plurality of lens rows comprise a first row including the first incident lens and a second row including the second incident lens.

13. The vehicle lamp of claim 11, wherein each of the plurality of incident lenses comprises a first incident area and a second incident area, and the first incident lens and the second incident lens have different curvatures in at least a portion of at least one of the first incident area or the second incident area.

14. The vehicle lamp of claim 13, wherein each of the plurality of incident lenses further comprises a third incident area disposed between the first incident area and the second incident area.

15. The vehicle lamp of claim 14, wherein the third incident area causes light incident thereto to proceed as substantially parallel light.

16. The vehicle lamp of claim 1, wherein each of the plurality of exit lenses is longer in an up-down direction than in a left-right direction.

17. The vehicle lamp of claim 1, further comprising a plurality of shields which obstruct a portion of light that proceeds toward the plurality of exit lenses.

18. The vehicle lamp of claim 17, wherein a center of a top edge of each of the plurality of shields is disposed at a rear focus of a corresponding exit lens among the plurality of exit lenses, and at least a portion of the top edge of each of the plurality of shields is inclined such that a first side is disposed higher than a second side along the left-right direction.

19. A vehicle lamp comprising:

a plurality of light source modules arranged in at least one direction;

a plurality of adjusting lenses that guide light emitted from each of the plurality of light source modules so as to adjust a path of the light; and a plurality of optical lenses that are tilted such that a first end is disposed more forward than a second end in at least one direction and output at least a portion of light, which is guided by and incident from each of the plurality of adjusting lenses, to form a predetermined beam pattern, wherein each of the plurality of optical lenses comprises:

an incident lens portion comprising a plurality of incident lenses; and an exit lens portion comprising a plurality of exit lenses corresponding to the incident lenses, wherein the plurality of incident lenses comprise:

a first incident lens that forms a first pattern area of the predetermined beam pattern; and a second incident lens that forms a second pattern area of the predetermined beam pattern, wherein the first incident lens and the second incident lens have different curvatures in at least a portion thereof, and wherein light incident on the first incident lens is output after being focused at a rear focus of an exit lens corresponding to the first incident lens among the plurality of exit lenses, and at least a portion of light incident on the second incident lens is output through another exit lens adjacent to an exit lens corresponding to the second incident lens among the plurality of exit lenses.

20. A vehicle lamp comprising:

a plurality of light source modules arranged in at least one direction;

a plurality of adjusting lenses that guide light emitted from each of the plurality of light source modules so as to adjust a path of the light; and a plurality of optical lenses that are tilted such that a first end is disposed more forward than a second end in at least one direction and output at least a portion of light, which is guided by and incident from each of the plurality of adjusting lenses, to form a predetermined beam pattern, wherein each of the plurality of optical lenses comprises:

an incident lens portion comprising a plurality of incident lenses; and an exit lens portion comprising a plurality of exit lenses corresponding to the incident lenses, and wherein each of the plurality of exit lenses is longer in an up-down direction than in a left-right direction, the left-right direction being substantially perpendicular to a direction in which light is emitted from the vehicle lamp.

* * * * *